(12) United States Patent
Branda et al.

(10) Patent No.: US 11,691,928 B2
(45) Date of Patent: Jul. 4, 2023

(54) COMPOSITIONS, SYSTEMS AND METHODS FOR DELIVERY OF AN ELEMENT IN RESPONSE TO BIOLOGICAL DEMAND

(71) Applicant: Lucent Biosciences, Inc., West Vancouver (CA)

(72) Inventors: Neil Robin Branda, North Vancouver (CA); Farahnaz Nourmohammadian, West Vancouver (CA); Peter Gross, Lions Bay (CA)

(73) Assignee: Lucent Biosciences, Inc., West Vancouver (CA)

( * ) Notice: Subject to any disclaimer, the term of this patent is extended or adjusted under 35 U.S.C. 154(b) by 322 days.

(21) Appl. No.: 17/055,950

(22) PCT Filed: May 17, 2019

(86) PCT No.: PCT/CA2019/050684
§ 371 (c)(1),
(2) Date: Nov. 16, 2020

(87) PCT Pub. No.: WO2019/218089
PCT Pub. Date: Nov. 21, 2019

(65) Prior Publication Data
US 2021/0253490 A1    Aug. 19, 2021

Related U.S. Application Data

(60) Provisional application No. 62/771,801, filed on Nov. 27, 2018, provisional application No. 62/673,691, filed on May 18, 2018.

(51) Int. Cl.
*C05D 9/02* (2006.01)
*C05G 3/40* (2020.01)
(Continued)

(52) U.S. Cl.
CPC .............. *C05D 9/02* (2013.01); *C05G 3/44* (2020.02); *C05G 5/40* (2020.02); *C05G 5/45* (2020.02)

(58) Field of Classification Search
None
See application file for complete search history.

(56) References Cited

U.S. PATENT DOCUMENTS 5,210,230 A * 5/1993 Payack ................ C07D 307/92
549/299
5,965,117 A   10/1999 Howard et al.
(Continued)

FOREIGN PATENT DOCUMENTS

CN        1192196      9/1998

OTHER PUBLICATIONS

International Search Report and Written Opinion dated Jul. 22, 2019 in Application No. PCT/CA2019/050684.
(Continued)

*Primary Examiner* — Wayne A Langel
(74) *Attorney, Agent, or Firm* — Procopio, Cory, Hargreaves & Savitch LLP

(57) ABSTRACT

The invention provides compositions and systems comprising a carrier and an element. The carrier is a network of polymers insoluble in water comprising phenolic hydroxyl moieties, aliphatic hydroxyl moieties or a combination thereof. An association between the carrier and the element is labile in response to biological demand and the lability of the association in the presence of water is less than the lability of the association in response to biological demand. Also provided are methods of making such compositions and methods for delivering the element to an organism.

15 Claims, 18 Drawing Sheets

(51) Int. Cl.
*C05G 5/40* (2020.01)
*C05G 5/00* (2020.01)

(56) References Cited

U.S. PATENT DOCUMENTS

| | | | |
|---|---|---|---|
| 6,767,565 B2 * | 7/2004 | Shukla | A61K 36/00 |
| | | | 424/725 |
| 8,642,507 B1 | 2/2014 | Entry et al. | |
| 2008/0236033 A1 | 10/2008 | Sun | |
| 2014/0235438 A1 * | 8/2014 | Thompson | C05F 11/02 |
| | | | 71/23 |

OTHER PUBLICATIONS

International Preliminary Report on Patentability dated Nov. 24, 2020 in Application No. PCT/CA2019/050684.
Extended European Search Report prepared by the European Patent Office for related application No. 19803100.7. dated Jan. 28, 2022. 7 pages.

* cited by examiner

COMPOSITIONS, SYSTEMS AND METHODS FOR DELIVERY OF AN ELEMENT IN RESPONSE TO BIOLOGICAL DEMAND

CROSS REFERENCE TO RELATED APPLICATIONS

This application is a U.S. national stage entry under 35 U.S.C. § 371 of International Application No. PCT/CA2019/050684 filed May 17, 2019 entitled "COMPOSITIONS, SYSTEMS AND METHODS FOR DELIVERY OF AN ELEMENT IN RESPONSE TO BIOLOGICAL DEMAND," which claims priority to, and the benefit of, U.S. Provisional Patent Application Ser. No. 62/771,801, filed on Nov. 27, 2018 and U.S. Provisional Patent Application Ser. No. 62/673,691, filed on May 18, 2018. Each of the foregoing applications are hereby incorporated by reference in their entirety.

FIELD

This invention relates to compositions, systems and methods for delivery of an element. In particular, the invention relates to compositions, systems and methods wherein the element associates with a carrier such that the element is released from the carrier through biological demand.

BACKGROUND

Various materials and compositions have been made that endeavor to bind elements to a substrate such that the elements are released slowly from the substrate in the presence of water.

In modern agriculture, nutrients are applied to soils to maximize the growth of plants. However, a significant proportion of nutrients simply wash away from the soils because they are water soluble. For example, rain and irrigation may cause applied nutrients to move vertically through the soil and away from plant roots, thereby limiting or prohibiting nutrient uptake by plants. Another issue with nutrient solubility in soils is agricultural run-off, which is a major contributor to the eutrophication of fresh water bodies. Phosphate, a common fertilizer, may promote the growth of cyanobacteria and algae in water bodies which can produce harmful toxins and cause a depletion of oxygen.

Trace metals, such as iron, zinc, copper, boron and magnesium, are also important components of soil chemistry that may be depleted by environmental effects and crop uptake, resulting in decreased crop yields. Trace mineral depletion may be caused by NPK fertilizers, which are known to dilute the concentrations of other nutrients in plants. Although NPK fertilizers improve crop yields, their use combined with progressively higher-yielding crop varieties may produce foods with lower mineral and nutrient concentrations than their less productive ancestors (Henkel M. Sustainable Agriculture III: Agricultural Practices. 2005; 18-19).

Trace metal deficiency in soil may be mitigated by replacing trace metals in soil; however, trace metal leaching limits the efficacy of fertilizers that contain these nutrients. Furthermore, over application of trace metals may result in reduced crop growth or crop mortality (Kampfenkel K, Van Montagu M, Inze D. Effects of Iron Excess on *Nicotiana plumbaginifolia* Plants (Implications to Oxidative Stress). Plant Physiology. 1995; 107(3):725-735). As a result, application of trace metals to soils must be done carefully and must avoid local areas of high concentration.

Trace metals should also be present in bioavailable form. Some trace metals such as boron are bioavailable in their common state, but others are not. Several factors may reduce the bioavailability of some trace metals if they are applied directly to the soil. For example, plants typically utilize iron as ferrous iron ($Fe^{2+}$). However, in soil some trace metals are present as positively charged metal ions and will readily react with oxygen and/or negatively charged hydroxide ions ($OH^-$). If they react with oxygen or hydroxide ions, they form new compounds such as ferric iron ($Fe^{3+}$) that are less bioavailable to plants. Both oxygen and hydroxide ions are abundant in soil and soilless growth media.

Trace metals are also important for the growth of phytoplankton. High nutrient low chlorophyll ("HNLC") regions in ocean waters exist where the growth of phytoplankton is not limited by macronutrients (for example, nitrate, phosphate or silicic acid) but is limited by insufficient concentration of micronutrients (for example, iron, zinc or cobalt). Low concentrations of metabolizable iron have been shown to be the dominant micronutrient limitation in HNLC waters (Lalli, Parsons. Biological Oceanography: An introduction (2004)).

Similar to land plants, phytoplankton are photosynthesizers which require nutrients and sunlight for photosynthesis to occur. The sunlit zone of the ocean is called the photic zone and it is the uppermost layer of water that is exposed to intense sunlight. Phytoplankton must therefore inhabit the photic zone to manifest photosynthesis.

Replacing missing iron in HNLC zones has limitations. One limitation is that for maximum effect, iron must remain in the photic zone if possible. Another limitation is that iron should be in its bioavailable form to maximize phytoplankton photosynthesis. Therefore, stimulation of phytoplankton growth in HNLC waters may be optimized by providing a positively buoyant source of iron that is bioavailable and is not toxic to phytoplankton growth if applied in high local concentrations.

U.S. Pat. No. 5,965,117 discloses water buoyant particulate materials containing micronutrients for phytoplankton. Water-soluble agents are used for adhering the nutrient compounds to water buoyant substrates and the nutrients are released continuously in the presence of water.

U.S. Pat. No. 8,642,507 discloses a fertilizer formulation for the reduction of nutrient and pesticide leaching. Semi-soluble decomposable polymers are used which release nutrients continuously in the presence of water.

Thus, there remains a need for a material that retains elements such as nutrients in a bioavailable form, that does not leach elements into its surroundings until sequestered though biological demand, may exhibit adjustable buoyancy in water and does not manifest toxicity to plants or phytoplankton even if applied in high local concentrations.

SUMMARY

In one aspect, the present disclosure provides compositions and systems comprising an element and a carrier wherein the element is released from the carrier in response to biological demand.

Various aspects of the present disclosure provide a composition comprising a carrier comprising phenolic hydroxyl moieties, aliphatic hydroxyl moieties or a combination thereof, wherein the carrier is a network of polymers and insoluble in water; and an element, wherein a salt of the element is soluble in the presence of water, and wherein an association between the carrier and the element is labile in response to biological demand and the lability of the association in the presence of water is less than the lability of the association in response to biological demand. In various embodiments, the association comprises element-hydroxide covalent bonding. In various embodiments, the element forms an aggregate of elements, the aggregate comprising element-element covalent bonding.

Various aspects of the present disclosure also provide a method for delivering an element to an organism, the method comprising adding a composition as disclosed herein to an environment of the organism. In various embodiments, the organism is a plant. In various embodiments, the organism is phytoplankton.

Various aspects of the present disclosure also provide a system for delivering an element to an organism, the system comprising a carrier which forms an association with the element that is labile in response to biological demand of the organism, wherein the carrier is a network of polymers insoluble in water comprising phenolic hydroxyl moieties, aliphatic hydroxyl moieties or a combination thereof, and the lability of the association in the presence of water is less than the lability of the association in response to biological demand.

Various aspects of the present disclosure also provide a method for preparing a composition as disclosed herein, the method comprising adding a base to a carrier in a solvent to deprotonate hydroxyl moieties, wherein the carrier comprises a network of polymers comprising phenolic hydroxyl moieties, aliphatic hydroxyl moieties or a combination thereof and is insoluble in water, adding a salt of an element to the carrier to form the composition, the salt being soluble in water, wherein the carrier and the element form an association; and isolating the composition. In various embodiments, the association comprises element-hydroxide covalent bonding.

Various aspects of the present disclosure also provide a composition comprising a carrier, wherein the carrier comprises wood pulp, barley straw, rice husk, coconut husk, wheat straw or a combination thereof; and an element, wherein a salt of the element is soluble in the presence of water, and wherein an association between the carrier and the element is labile in response to biological demand and the lability of the association in the presence of water is less than the lability of the association in response to biological demand.

Other aspects and features of the present invention will become apparent to those of ordinary skill in the art upon review of the following description of specific embodiments of the invention in conjunction with the accompanying claims.

BRIEF DESCRIPTION OF THE DRAWINGS

In drawings which illustrate embodiments of the disclosure.

DETAILED DESCRIPTION

Figure 1:
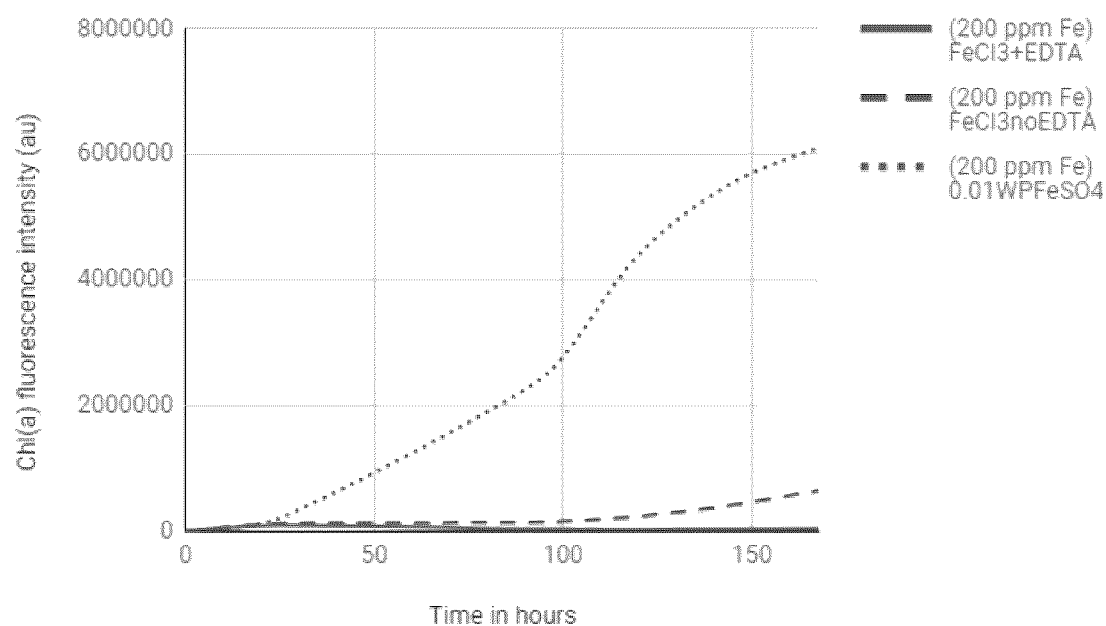
FIG. 1 shows chlorophyll fluorescence as a function of time for phytoplankton grown in the presence of a composition as disclosed herein and iron chloride in the presence and absence of EDTA.

In the context of the present disclosure, various terms are used in accordance with what is understood to be the ordinary meaning of those terms.

In various embodiments, the disclosure provides compositions and systems comprising a carrier comprising phenolic hydroxyl moieties, aliphatic hydroxyl moieties or a combination thereof, wherein the carrier is a network of polymers and insoluble in water; and an element, wherein a salt of the element is soluble in water, wherein an association between the carrier and the element is labile in response to biological demand and the lability of the association in the presence of water is less than the lability of the association in response to biological demand.

The term "element" refers to a micronutrient that sustains an organism in its existence, by promoting organism growth, replacing loss and/or providing energy. The element can be taken into the organism by any means that the organism uses to take in nutrients. For example, if the organism is a plant, it typically absorbs nutrients through its roots and leaves. The element may be a micronutrient for phytoplankton growth. The term "phytoplankton" refers to any and/or all aquatic organisms capable of photosynthesis. The element may be a micronutrient for plant growth. In various elements, the element may be Mn, Fe, Co, Cu, Zn, B, Si or Mg or any isotope thereof. In various embodiments, the element is $Fe^{2+}$ or $Fe^{3+}$.

In various embodiments, the element is in a biologically available form. The term "biologically available form" means that a micronutrient is present in an oxidation state that allows for transport across a cellular membrane without requiring a reduction or change in oxidation state prior to cross-membrane transport.

The term "labile" refers to an association between a carrier and an element that is apt or likely to break, or rapidly cleave. For example, the association between the carrier and the element may be labile in response to biological demand.

The term "non-labile" refers to an association between the carrier and the element that is substantially stable. For example, the association between the carrier and element may be non-labile in water or other liquids. In various embodiments, the lability of the association in the presence of water is less than the lability of the association in response to biological demand. In various embodiments, the association is non-labile in water of varying ionic strength and over a wide range of pH. In various embodiments, the association between the carrier and the element is non-labile in the presence of water at a pH between about 4 and about 10, or any pH therebetween. In various embodiments, the association is non-labile in the presence of water at a pH between about 5 and about 10. In various embodiments, the association is non-labile in the presence of water at a pH between about 6 and about 10. In various embodiments, the association is non-labile in the presence of water at a pH between about 7 and about 10. In various embodiments, the association is non-labile in the presence of water at a pH between about 7 and about 9. In various embodiments, the association is non-labile in the presence of water at a pH between about 7.5 and about 10. In various embodiments, the association is non-labile in the presence of water at a pH between about 7.5 and about 9.

The term "biological demand" refers to an act of acquisition or interaction between an organism and the composition in which the element is acquired or sequestered from the composition and taken into cells through trans-membrane transport or into tissues of the organism for photosynthesis and/or growth. In various embodiments, the association between the carrier and the element is non-labile in the presence of water but labile in response to biological demand. The organism may be a plant. The organism may be phytoplankton.

As the association between the carrier and the element is labile in response to biological demand, a rate of release of the element from the carrier is governed by the level of biological demand around the composition. For example, a higher concentration of biological demand may result in a faster release of the element from the carrier than a lower concentration of biological demand. The higher concentration of biological demand may result from the number of plants or amount of phytoplankton in a particular area. As the rate of release depends on biological demand, an area of high localized concentration of element may not form. Such an area of high localized concentration is undesirable as the element may be toxic to plants or phytoplankton in these high concentrations.

In various embodiments, the carrier is a network of polymers insoluble in water comprising phenolic hydroxyl moieties, aliphatic hydroxyl moieties, or a combination thereof. The carrier may comprise lignin, cellulose or a combination thereof. For example, the carrier may comprise about 0.2% to about 40% (w/w) lignin and about 60% to about 98.8% (w/w) cellulose to total weight of the carrier, or any amounts therebetween. The carrier may comprise about 15.7% (w/w) lignin and about 84.3% (w/w) cellulose to total weight of the carrier. In various embodiments, the carrier comprises cellulose.

In various embodiments, the carrier is a fibre comprising phenolic hydroxyl moieties, aliphatic hydroxyl moieties, or a combination thereof. The term "fibre" refers to a component of plant material that is not soluble in water.

Lignin is a naturally occurring amorphous complex cross-linked organic macromolecule that comprises an integral component of all plant biomass. The chemical structure of lignin is irregular in the sense that different structural units (e.g. phenylpropane units) are not linked to each other in any systematic order. It is known that lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures (guaiacyl monolignol, syringyl monolignol and p-hydroxyphenyl monolignol) that are polymerized via specific linkages to form a lignin macromolecule comprising both aliphatic hydroxyl groups and phenolic hydroxyl groups.

Cellulose is a polysaccharide consisting of a linear chain of $\beta(1\rightarrow4)$ linked D-glucose units having the formula $(C_6H_{10}O_5)_n$ and comprising aliphatic hydroxyl groups and phenolic hydroxyl groups.

Sources of the carrier may be synthetic or naturally occurring fibres. Examples of naturally occurring fibres include one or more of wood pulp, rice husk, coconut fibre, coconut husk, ground rice husk, unground rice husk, barley straw, wheat straw, straw, cotton, flax, jute, hemp, bamboo or any combination thereof. For example, the carrier may be coconut husk, wood pulp, ground rice husk, barley straw or wheat straw. In various embodiments, the carrier may be wood pulp. Examples of synthetic fibres include one or more of chemically synthesized lignins and/or cellulose.

In various embodiments, the carrier comprises differing ratios of phenolic hydroxyl moieties to aliphatic hydroxyl moieties. For example, the carrier may comprise up to about 40% (w/w) lignin based on a total weight of the carrier or any amount therebetween, such as up to about 27% lignin, thereby providing a different ratio of phenolic hydroxyl moieties to aliphatic hydroxyl moieties in the carrier. Methods for measuring the aliphatic hydroxyl content and phenolic hydroxyl content of the carriers are known to a person of ordinary skill in the art. In various embodiments, where the element is a transition metal, the ratio of phenolic hydroxyl moieties to aliphatic hydroxyl moieties may be adjusted, for example, by varying the ratio of lignin and cellulose in the carrier, to favour different oxidation states of these metals. For example, by synthesizing the carrier using varying ratios of phenolic hydroxyl moieties to aliphatic hydroxyl moieties, the composition may comprise variable concentrations of $Fe^{2+}$ to $Fe^{3+}$.

In various embodiments, the composition may be synthesized by immersing the carrier in a base to deprotonate the hydroxyl moieties. The carrier may be in a solvent such as water or an organic solvent when the base is added. In various embodiments, the organic solvent is a polar organic solvent. In various embodiments, the organic solvent may be acetonitrile, methanol or ethanol. The amount of base used to deprotonate the carrier may be adjusted. For example, up to 30% (w/w) base to total weight of the carrier may be used or any amount therebetween. For example, about 5%, about 10%, about 20% or about 30% (w/w) base to total weight of the carrier may be used.

In various embodiments, the base may be any base that can deprotonate the phenolic hydroxyl moieties and/or aliphatic hydroxyl moieties. In various embodiments, the base may be triethylamine, sodium carbonate or sodium bicarbonate.

Subsequently, the desired element, or a plurality of elements, is added to the carrier and forms an association between the carrier and the element. For example, a salt of the element may be added to the carrier material at about 5% to about 30% (w/w) to a total weight of the carrier. For example, about 5%, about 10% or about 20% (w/w) salt to total weight of the carrier may be added. In various embodiments, the salt may be a metal salt. In various embodiments, the metal salt may be a metal chlorate, a metal chloride, a metal sulphate or a metal carbonate. The metal salt may be a metal chloride or a metal sulphate of Zn, Mn, Mg, Cu, Co, B, silicon monoxide or silicon tetraacetate. The metal salt may be $FeCl_3$ or $Fe_2(SO_4)_3$.

In various embodiments, the association between the carrier and the element is labile in response to biological demand and the lability of the association in the presence of water is less than the lability of the association in response to biological demand at a temperature between 0° C. and about 50° C.

In various embodiments, the association between the carrier and the element comprises chemical bonding. In various embodiments, the chemical bonding comprises element-hydroxide covalent bonding. In various embodiments, the association comprises adsorption, element-hydroxide covalent bonding, ionic interaction, Van der Waals interactions, or any combination thereof. In various embodiments, the association comprises element-hydroxide covalent bonding. In various embodiments, the element may form an aggregate of elements. In various embodiments, the aggregate comprises element-element covalent bonding.

In various embodiments, the composition has adjustable buoyancy in liquids with a density between about 1 kg/L and about 1.03 kg/L, such as, but not limited to, water. For example, the composition may have a positive, neutral or negative buoyancy in water of varying ionic strength. The buoyancy of the composition may be adjusted by varying the ratio of phenolic hydroxyl moieties to aliphatic hydroxyl moieties in the carrier, adjusting the amount of element in the composition, or adjusting the method of preparation of the composition.

In various embodiments, the composition is resistant to element leaching in water. In various embodiments, the carrier composition may minimize or decrease element leaching into water sources.

In various embodiments, addition of the composition to water, to soil, to an environment comprising water, or to an aqueous environment results in neutral change to surrounding pH. For example, when the composition is immersed in water, the pH of the water may remain substantially the same.

In various embodiments, the composition may be non-toxic. For example, the composition does not cause nutrient toxicity when deployed in high concentrations.

In various embodiments, the composition may be added to an environment of an organism in order to increase growth of the organism. The environment may be an ocean, a lake, a river, a stream, a slough, an estuary, a creek, an agricultural field or soil. The organism may be a plant or phytoplankton. In various embodiments, the carrier composition may be applied to soil.

EXAMPLES

These examples illustrate various aspects of the invention, evidencing a variety of conditions for preparing compositions and systems comprising a carrier comprising phenolic hydroxyl moieties, aliphatic hydroxyl moieties or a combination thereof, wherein the carrier is a network of polymers and insoluble in water; and an element, wherein a salt of the element is soluble in water, and wherein an association between the carrier and the element is labile in response to biological demand and the lability of the association in the presence of water is less than the lability of the association in response to biological demand. Selected examples are illustrative of advantages that may be obtained compared to alternative methods, and these advantages are accordingly illustrative of particular embodiments and not necessarily indicative of the characteristics of all aspects of the invention.

As used herein, the term "about" refers to an approximately +/−10% variation from a given value. It is to be understood that such a variation is always included in any given value provided herein, whether or not it is specifically referred to.

Example 1: Preparation of a Carrier Composition Using Sodium Bicarbonate and Water A carrier consisting of an organic fibre (wood pulp) (about 1 g) containing about 16% (w/w) lignin and about 84% (w/w) cellulose was mixed with distilled water (about 60 mL). The mixture was stirred at room temperature (about 21° C.) for a period of about 5 minutes. The mixture was then made alkaline using sodium bicarbonate at a percentage of about 30% (w/w) to total weight of the organic fibre. The pH of the mixture was about 11. The mixture was then allowed to rest for a period of about 5 to about 10 minutes. Next, $Fe^{3+}$ salt was added to the mixture in the form of iron chloride at a ratio of about 20% (w/w) to the organic fibre. This mixture was then heated to a temperature of about 80° C. and maintained at about 80° C. for a period of about 1 hour. The mixture was cooled to room temperature for a period of about 5 hours. The carrier composition was isolated by filtering and washing with distilled water at room temperature and then allowing the carrier composition to dry at room temperature. Alternatively, the carrier composition was dried in a vacuum oven at about 40° C. to accelerate the final drying process.

Iron sulfate at a ratio of 20% (w/w) to the total weight of the carrier was substituted for iron chloride in the method described above. Metal chlorides and metal sulphates for Zn, Mn, Mg, B, Cu, Co, silicon monoxide and silicon tetraacetate may also be substituted for iron chloride. Iron sulphate may be substituted for iron chloride.

Nine different carriers were used in this Example. Each carrier was a variety of a wood pulp containing varying ratios of lignin and cellulose. All carriers were supplied by the Canfor Company. The carriers are listed in Table 1. The lignin content and cellulose content refer to % (w/w) to total weight of the carrier.

TABLE 1

Carriers used to prepare compositions according to Examples 1 and 2

| Carrier | Name | Lignin Content (%) | Cellulose Content (%) |
|---|---|---|---|
| A | Aspen TMP | 8.2 | 91.8 |
| B | Softwood | 13.9 | 86.1 |
| C | WP 350 | 15.7 | 84.3 |
| D | Aspen Kraft | 0.2 | 99.8 |
| E | NBSK | 0.2 | 99.8 |
| F | EUCAL | 0.2 | 99.8 |
| G | BWP | 0 | 100 |
| H | UBWP | 1.2 | 98.8 |
| I | WP3254 | 27 | 73 |

Example 2: Preparation of a Carrier Composition Using Triethylamine and Acetonitrile A carrier consisting of an organic fibre (about 1 g) containing about 16% (w/w) lignin and about 84% (w/w) cellulose was mixed with acetonitrile (about 60 mL). The mixture was stirred at room temperature (about 21° C.) for a period of about 5 minutes. The mixture was then made alkaline using triethylamine at a percentage of about 30% (w/w) to the total weight of the carrier. The pH of the mixture was about 11. The mixture was then allowed to rest for a period of about 5 to about 10 minutes. Next, $Fe^{3+}$ salt was added to the mixture in the form of iron chloride at a ratio of about 20% (w/w) to total weight of the carrier. This mixture was then heated to a temperature of about 80° C. and maintained at about 80° C. for a period of about 1 hour. The mixture was cooled to room temperature for a period of about 5 hours. The composition was isolated by filtering and washing with distilled water at room temperature and then drying at room temperature. Alternatively, the carrier composition was dried in a vacuum oven at about 40° C. to accelerate the final drying process.

As described above, various metal salts in varying amounts were also substituted for iron chloride. Furthermore, the method was repeated using the various wood pulps listed in Table 1.

Example 3: Element Loading

The compositions produced according to Example 1 were tested for iron loading by elemental analysis. Analysis was undertaken with a CHN Analyzer. The CHN analysis provided the percent by weight of C, H, N and O in each sample. The difference between this percent by weight and the total weight of the sample was the amount of iron present, as there were no other elements present in the compositions. Table 2 shows the percentage weight of the loaded iron compared to the weight of wood pulp for various experimental conditions relating to carrier, reaction temperature, iron salt, and amount of base (% $NaHCO_3$ (w/w) to total weight of the carrier) used for the preparation of each composition using water as the solvent. The amount of iron in the compositions increased with increasing amounts of iron salt used for preparation of the compositions.

TABLE 2

Iron loading in compositions produced using water as the solvent and $NaHCO_3$ as the base

| Carrier[1] | Reaction Temperature | Iron salt | $NaHCO_3$ (% (w/w)) | Iron Loading (% (w/w)) |
|---|---|---|---|---|
| C | 80° C. | 20% (w/w) $Fe_2(SO_4)_3$ | 30 | 5 |
| C | 80° C. | 20% (w/w) $FeCl_3$ | 30 | 8 |
| C | 80° C. | 10% (w/w) $FeCl_3$ | 20 | 6 |
| C | 80° C. | 20% (w/w) $FeCl_3$ | 10 | 3 |
| C | 80° C. | 20% (w/w) $FeCl_3$ | 5 | 3 |
| C | 80° C. | 20% (w/w) $FeCl_3$ | 0 | 1 |
| C | 21° C. | 20% (w/w) $FeCl_3$ | 30 | 0.2 |
| D | 80° C. | 20% (w/w) $FeCl_3$ | 30 | 2 |
| I | 80° C. | 20% (w/w) $FeCl_3$ | 30 | 6.4 |

[1]Carrier refers to the designation of the wood pulp from Table 1

The compositions produced according to Example 2 were tested for iron loading using the same elemental analysis approach described above. Table 3 shows the percentage weight of the loaded iron compared to the weight of wood pulp for various experimental conditions relating to carrier, reaction temperature, iron salt, and amount of base (% $(C_2H_5)_3N$ (w/w) to total weight of the carrier) used for the preparation of each composition using acetonitrile as the solvent.

TABLE 3

Iron loading in compositions produced using acetonitrile as the solvent and triethylamine as the base

| Carrier[1] | Reaction Temperature | Iron salt | Triethylamine (% (w/w)) | Iron Loading (% (w/w)) |
|---|---|---|---|---|
| A | 80° C. | 10% (w/w) $Fe_2(SO_4)_3$ | 30 | 6 |
| B | 80° C. | 10% (w/w) $Fe_2(SO_4)_3$ | 30 | 5 |
| C | 80° C. | 10% (w/w) $Fe_2(SO_4)_3$ | 30 | 4 |
| C | 80° C. | 20% (w/w) $FeCl_3$ | 30 | 5 |
| C | 80° C. | 10% (w/w) $FeCl_3$ | 30 | 5 |
| C | 80° C. | 5% (w/w) $FeCl_3$ | 30 | 3 |
| C | 21° C. | 10% (w/w) $Fe_2(SO_4)_3$ | 30 | 1 |
| D | 80° C. | 10% (w/w) $Fe_2(SO_4)_3$ | 30 | 5 |
| E | 80° C. | 10% (w/w) $Fe_2(SO_4)_3$ | 30 | 2 |
| F | 80° C. | 10% (w/w) $Fe_2(SO_4)_3$ | 30 | 4 |
| G | 80° C. | 10% (w/w) $Fe_2(SO_4)_3$ | 30 | 5 |
| H | 80° C. | 10% (w/w) $Fe_2(SO_4)_3$ | 30 | 4 |
| I | 80° C. | 10% (w/w) $Fe_2(SO_4)_3$ | 30 | 2 |

[1]Carrier refers to the designation of the wood pulp from Table 1

Example 4: Element-Carrier Association

Compositions prepared from the methods set out in Examples 1 and 2 were subjected to analysis using an Explorer scanning electron microscope manufactured by FEI/Aspex. The results showed that iron was covalently bonded to hydroxyl moieties of the carrier in a single layer (referred to as "Bonding Type A %" in Table 4 below). The results also showed that the composition comprised one or more additional layers of iron that were covalently bonded through iron-iron bonds to the first layer (referred to as "Bonding Type B %" in Table 4 below). The relative amounts of each bonding type are set out in Table 4 for each of the compositions analyzed as well as the reaction conditions used to prepare each composition. This result shows that the element may form aggregates and the aggregates may comprise element-element covalent bonds.

TABLE 4

Nature of element-carrier association for various compositions

| Carrier | Solvent | Base | Iron Salt (% (w/w) to total weight of carrier) | Bonding Type A % | Bonding Type B % |
|---|---|---|---|---|---|
| A | $CH_3CN$ | $(C_2H_5)_3N$ | 10% (w/w) $Fe_2(SO_4)_3$ | 60 | 40 |
| C | $CH_3CN$ | $(C_2H_5)_3N$ | 10% (w/w) $Fe_2(SO_4)_3$ | 60 | 40 |
| C | $CH_3CN$ | $(C_2H_5)_3N$ | 20% (w/w) $FeCl_3$ | 60 | 40 |
| C | $CH_3CN$ | $(C_2H_5)_3N$ | 10% (w/w) $FeCl_3$ | 60 | 40 |
| C | $CH_3CN$ | $(C_2H_5)_3N$ | 5% (w/w) $FeCl_3$ | 60 | 40 |
| C | Water | $Na_2CO_3$ | 20% (w/w) $Fe_2(SO_4)_3$ | 60 | 40 |
| C | Water | $Na_2CO_3$ | 20% (w/w) $FeCl_3$ | 60 | 40 |
| C | Water | $Na_2CO_3$ | 10% (w/w) $FeCl_3$ | 60 | 40 |
| D | $CH_3CN$ | $(C_2H_5)_3N$ | 10% (w/w) $Fe_2(SO_4)_3$ | 30 | 70 |
| G | $CH_3CN$ | $(C_2H_5)_3N$ | 10% (w/w) $Fe_2(SO_4)_3$ | 20 | 80 |
| I | $CH_3CN$ | $(C_2H_5)_3N$ | 10% (w/w) $Fe_2(SO_4)_3$ | 60 | 40 |
| I | Water | $NaHCO_3$ | 20% (w/w) $FeCl_3$ | 60 | 40 |

[1]Carrier refers to the designation of the wood pulp from Table 1
[2]All methods were carried out at a temperature of 80° C.
[3]All methods used 30% (w/w) base to total amount of carrier

Example 5: Bioavailability and Growth Rate

Bioavailability of the compositions was rated on a scale of 0 to 10, where 10 represents maximum bioavailability of all samples tested and 0 represents minimum bioavailability of all samples tested. All compositions showed at least some bioavailability. To define a metric for bioavailability, the growth rate of *Euglena* phytoplankton was measured in an iron limited solution. The compositions were introduced into samples of phytoplankton combined with MES growth medium. The combination was subsequently placed into a temperature-controlled growth chamber that was maintained at approximately room temperature (about 21° C.) with a light source consisting of an aquatic plant Aquarium lamp (13 W 6500 White LED grow-lamp). The growth of phytoplankton was measured by using Chlorophyll (a) fluoroscopy, which uses chlorophyll fluorescence to determine the biomass of phytoplankton abundance. Fluorescence spectra were obtained using an FLS-920 Edinburgh Fluorescence Spectrometer with a Xenon lamp and 1.0 cm quartz cells. The results are shown in Table 5.

Using the same measurement methodology as described above, the growth rate was measured which is the rate of change of Euglena phytoplankton growth. A high growth rate does not necessarily mean high bioavailability. The results were rated on a scale of 0-10, with 10 representing the maximum rate of growth and 0 representing no growth. These results are also shown in Table 5.

TABLE 5

Bioavailability and growth rate of Euglena phytoplankton in presence of various compositions

| Carrier | Solvent | Base | Iron Salt (% (w/w) to carrier) | Bio-availability | Growth Rate |
|---|---|---|---|---|---|
| A | $CH_3CN$ | $(C_2H_5)_3N$ | 10% (w/w) $Fe_2(SO_4)_3$ | 10 | 8 |
| B | $CH_3CN$ | $(C_2H_5)_3N$ | 10% (w/w) $Fe_2(SO4)_3$ | 2 | 10 |
| C | $CH_3CN$ | $(C_2H_5)_3N$ | 10% (w/w) $Fe_2(SO4)_3$ | 10 | 10 |
| C | $CH_3CN$ | $(C_2H_5)_3N$ | 20% (w/w) $FeCl_3$ | 10 | 10 |
| C | $CH_3CN$ | $(C_2H_5)_3N$ | 10% (w/w) $FeCl_3$ | 10 | 10 |
| C | $CH_3CN$ | $(C_2H_5)_3N$ | 5% (w/w) $FeCl_3$ | 10 | 10 |
| C | Water | $Na_2CO_3$ | 20% (w/w) $Fe_2(SO_4)_3$ | 10 | 10 |
| C | Water | $Na_2CO_3$ | 20% (w/w) $FeCl_3$ | 10 | 10 |
| C | Water | $Na_2CO_3$ | 10% (w/w) $FeCl_3$ | 10 | 10 |
| D | $CH_3CN$ | $(C_2H_5)_3N$ | 10% (w/w) $Fe_2(SO_4)_3$ | 5 | 10 |
| E | $CH_3CN$ | $(C_2H_5)_3N$ | 10% (w/w) $Fe_2(SO_4)_3$ | 5 | 6 |
| F | $CH_3CN$ | $(C_2H_5)_3N$ | 20% (w/w) $FeCl_3$ | 5 | 1 |
| G | $CH_3CN$ | $(C_2H_5)_3N$ | 10% (w/w) $Fe_2(SO_4)_3$ | 10 | 10 |
| H | $CH_3CN$ | $(C_2H_5)_3N$ | 10% (w/w) $Fe_2(SO_4)_3$ | 1 | 1 |
| I | $CH_3CN$ | $(C_2H_5)_3N$ | 10% (w/w) $Fe_2(SO_4)_3$ | 2 | 10 |
| I | Water | $Na_2CO_3$ | 20% (w/w) $FeCl_3$ | 2 | 10 |

[1]Carrier refers to the designation of the wood pulp from Table 1
[2]All methods were carried out at a temperature of 80° C.
[3]All methods used 30% (w/w) base to total amount of carrier Example 6: Buoyancy Buoyancy of the compositions was rated on a scale of 0-10, with 10 representing maximum buoyancy (floating) and 0 representing negative buoyancy (sinking). Buoyancy refers to the percentage of product that remained positively buoyant in fresh water at approximately 21° C. A rating of 10 means that all the product was positively buoyant, 5 means half of the product was positively buoyant and half was negatively buoyant, and 0 means none of the product was positively buoyant and all of it was negatively buoyant. The results are shown in Table 6. In various embodiments, a steady state condition of buoyancy was established after about 25 to about 45 minutes.

TABLE 6

Buoyancy of various compositions

| Carrier | Solvent | Base | Iron Salt (% (w/w) to carrier) | Buoyancy |
|---|---|---|---|---|
| A | $CH_3CN$ | $(C_2H_5)_3N$ | 10% (w/w) $Fe_2(SO_4)_3$ | 4 |
| B | $CH_3CN$ | $(C_2H_5)_3N$ | 10% (w/w) $Fe_2(SO_4)_3$ | 10 |
| C | $CH_3CN$ | $(C_2H_5)_3N$ | 10% (w/w) $Fe_2(SO_4)_3$ | 10 |

TABLE 6-continued

Buoyancy of various compositions

| Carrier | Solvent | Base | Iron Salt (% (w/w) to carrier) | Buoyancy |
|---|---|---|---|---|
| C | $CH_3CN$ | $(C_2H_5)_3N$ | 20% (w/w) $FeCl_3$ | 10 |
| C | $CH_3CN$ | $(C_2H_5)_3N$ | 10% (w/w) $FeCl_3$ | 10 |
| C | $CH_3CN$ | $(C_2H_5)_3N$ | 5% (w/w) $FeCl_3$ | 10 |
| C | Water | $NaHCO_3$ | 20% (w/w) $Fe_2(SO_4)_3$ | 10 |
| C | Water | $NaHCO_3$ | 20% (w/w) $FeCl_3$ | 10 |
| C | Water | $NaHCO_3$ | 10% (w/w) $FeCl_3$ | 10 |
| D | $CH_3CN$ | $(C_2H_5)_3N$ | 10% (w/w) $Fe_2(SO_4)_3$ | 10 |
| E | $CH_3CN$ | $(C_2H_5)_3N$ | 10% (w/w) $Fe_2(SO_4)_3$ | 4 |
| F | $CH_3CN$ | $(C_2H_5)_3N$ | 20% (w/w) $FeCl_3$ | 2 |
| G | $CH_3CN$ | $(C_2H_5)_3N$ | 10% (w/w) $Fe_2(SO_4)_3$ | 1 |
| H | $CH_3CN$ | $(C_2H_5)_3N$ | 10% (w/w) $Fe_2(SO_4)_3$ | 1 |
| I | $CH_3CN$ | $(C_2H_5)_3N$ | 10% (w/w) $Fe_2(SO_4)_3$ | 1 |
| I | Water | $Na_2CO_3$ | 20% (w/w) $FeCl_3$ | 1 |

[1]Carrier refers to the designation of the wood pulp from Table 1
[2]All methods were carried out at a temperature of 80° C.
[3]All methods used 30% (w/w) base to total amount of carrier Example 7: Leaching In the context of this experiment, leaching refers to the extent to which the element dissolved in water when the composition was placed in water. The results of this experiment were rated on a scale of 1-10, with 1 representing no measurable leaching and 10 representing the highest amount of leaching. Leaching was tested in acidic (pH 4), neutral (pH 7) and alkaline (pH 8-9) water. For example, the composition was immersed in fresh water at room temperature (21° C.) at a pH of 4 to determine if the element, in this case iron, would dissolve water. The method used to determine iron leaching was the Marczenko method (Z. Marczenko & M. Balcerzak, "Separation, Preconcentration, and Spectrophotometry in Inorganic Analysis", Chapter 26-2-2-1, 10-phenanthroline method (pages 228-230): Elsevier, Oct. 18, 2000). The results are shown in Table 7. The experiments were also repeated at elevated temperature by heating water at pH 7 to about 50° C. for 5 hours. The leaching scale of this high temperature experiment was the same as described above.

TABLE 7

Leaching of element from various compositions

| | | | Iron Salt | Leaching at Various pH | | |
|---|---|---|---|---|---|---|
| Carrier | Solvent | Base | (% (w/w) to carrier) | 4 | 7 | 8-9 |
| A | $CH_3CN$ | $(C_2H_5)_3N$ | 10% (w/w) $Fe_2(SO_4)_3$ | 8 | 2 | 3 |
| B | $CH_3CN$ | $(C_2H_5)_3N$ | 10% (w/w) $Fe_2(SO_4)_3$ | 5 | 1 | 2 |
| C | $CH_3CN$ | $(C_2H_5)_3N$ | 10% (w/w) $Fe_2(SO_4)_3$ | 3 | 1 | 1 |
| C | $CH_3CN$ | $(C_2H_5)_3N$ | 20% (w/w) $FeCl_3$ | 3 | 1 | 1 |
| C | $CH_3CN$ | $(C_2H_5)_3N$ | 10% (w/w) $FeCl_3$ | 3 | 1 | 1 |
| C | $CH_3CN$ | $(C_2H_5)_3N$ | 5% (w/w) $FeCl_3$ | 3 | 1 | 1 |
| C | Water | $NaHCO_3$ | 20% (w/w) $Fe_2(SO_4)_3$ | 3 | 1 | 1 |
| C | Water | $NaHCO_3$ | 20% (w/w) $FeCl_3$ | 3 | 1 | 1 |
| C | Water | $NaHCO_3$ | 10% (w/w) $FeCl_3$ | 3 | 1 | 1 |
| D | $CH_3CN$ | $(C_2H_5)_3N$ | 10% (w/w) $Fe_2(SO_4)_3$ | 3 | 1 | 1 |
| E | $CH_3CN$ | $(C_2H_5)_3N$ | 10% (w/w) $Fe_2(SO_4)_3$ | 3 | 1 | 1 |
| F | $CH_3CN$ | $(C_2H_5)_3N$ | 20% (w/w) $FeCl_3$ | 7 | 2 | 2 |
| G | $CH_3CN$ | $(C_2H_5)_3N$ | 10% (w/w) $Fe_2(SO_4)_3$ | 3 | 1 | 1 |
| H | $CH_3CN$ | $(C_2H_5)_3N$ | 10% (w/w) $Fe_2(SO_4)_3$ | 9 | 3 | 1 |
| I | $CH_3CN$ | $(C_2H_5)_3N$ | 10% (w/w) $Fe_2(SO_4)_3$ | 4 | 1 | 1 |
| I | Water | $Na_2CO_3$ | 20% (w/w) $FeCl_3$ | 4 | 1 | 1 |

[1]Carrier refers to the designation of the wood pulp from Table 1
[2]All methods were carried out at a temperature of 80° C.
[3]All methods used 30% (w/w) base to total amount of carrier

Example 8: Toxicity

A composition comprising iron on wood pulp prepared from Example 1 using $FeSO_4$ and different concentrations of various iron compounds (200 ppm Fe as $FeCl_3$ in the presence of EDTA, and 200 ppm as $FeCl_3$ without EDTA) were introduced into separate samples of phytoplankton combined with MES growth medium. The combination was subsequently placed into a temperature-controlled growth chamber that was maintained at approximately room temperature (about 21° C.) with a light source consisting of an aquatic plant Aquarium lamp (13 W 6500 White LED grow-lamp). The growth of phytoplankton was measured by using Chlorophyll (a) fluoroscopy, which uses chlorophyll fluorescence to determine the biomass of phytoplankton abundance. Fluorescence spectra were obtained using an FLS-920 Edinburgh Fluorescence Spectrometer with a Xenon lamp and 1.0 cm quartz cells. The results are shown in FIG. 1.

No growth of phytoplankton was observed from the $FeCl_3$ and EDTA experiment. Negligible growth of phytoplankton was observed from the $FeCl_3$ experiment. However, substantial growth of phytoplankton was observed from the composition experiment.

This surprising result indicates that the Fe, when unbound was toxic to the growth of phytoplankton, whereas the Fe when interacting with the carrier exhibited substantial bioavailability.

Example 9: Effect of Composition on pH of Surrounding Water

Since the pH of water is an important factor in biology for microorganism growth and survival, experiments were undertaken to determine what effect the compositions had on the pH of surrounding water.

The effects of 4 ppm iron-loaded composition ("Fe—WP"), iron chloride and iron sulfate on the pH of tap water was examined. As shown in Table 8, 4 ppm Fe—WP reduced the pH of tap water by a maximum of 0.5 units. However, the same amount of iron with sources of iron chloride and iron sulfate reduced the pH of tap water within a range of 1.6-2.9 units.

TABLE 8

Effect of various materials on pH of tap water

| Material | PH |
| --- | --- |
| Tap water | 6.93 |
| Fe-WP | 6.41 |
| $FeCl_3$ | 4.03 |
| $Fe_2(SO_4)_3$ | 4.17 |

Example 10: Delivery of Iron to Phytoplankton

Figure 2A:
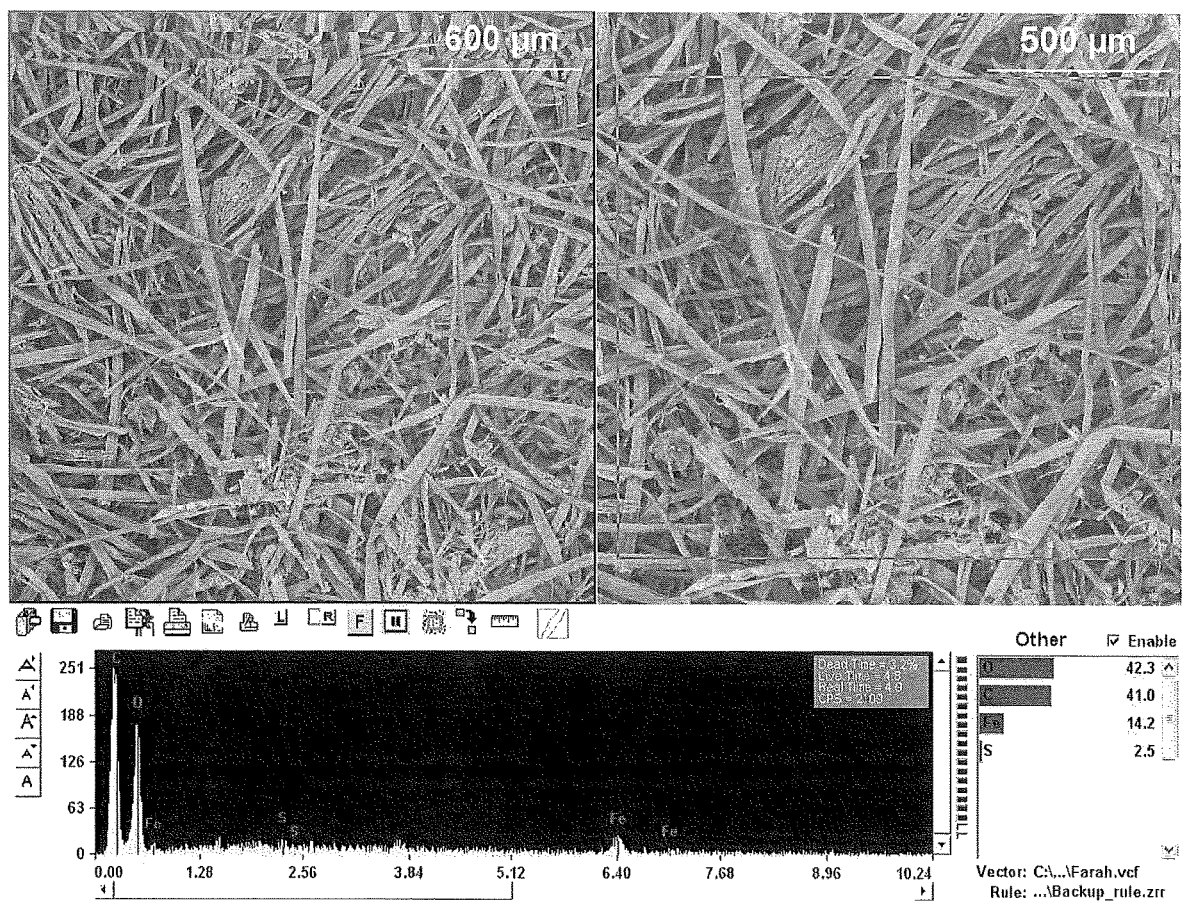
FIGS. 2(a) and (b) show SEM-EDS images of a composition as disclosed herein after culturing with phytoplankton for one week.
Figure 2B:
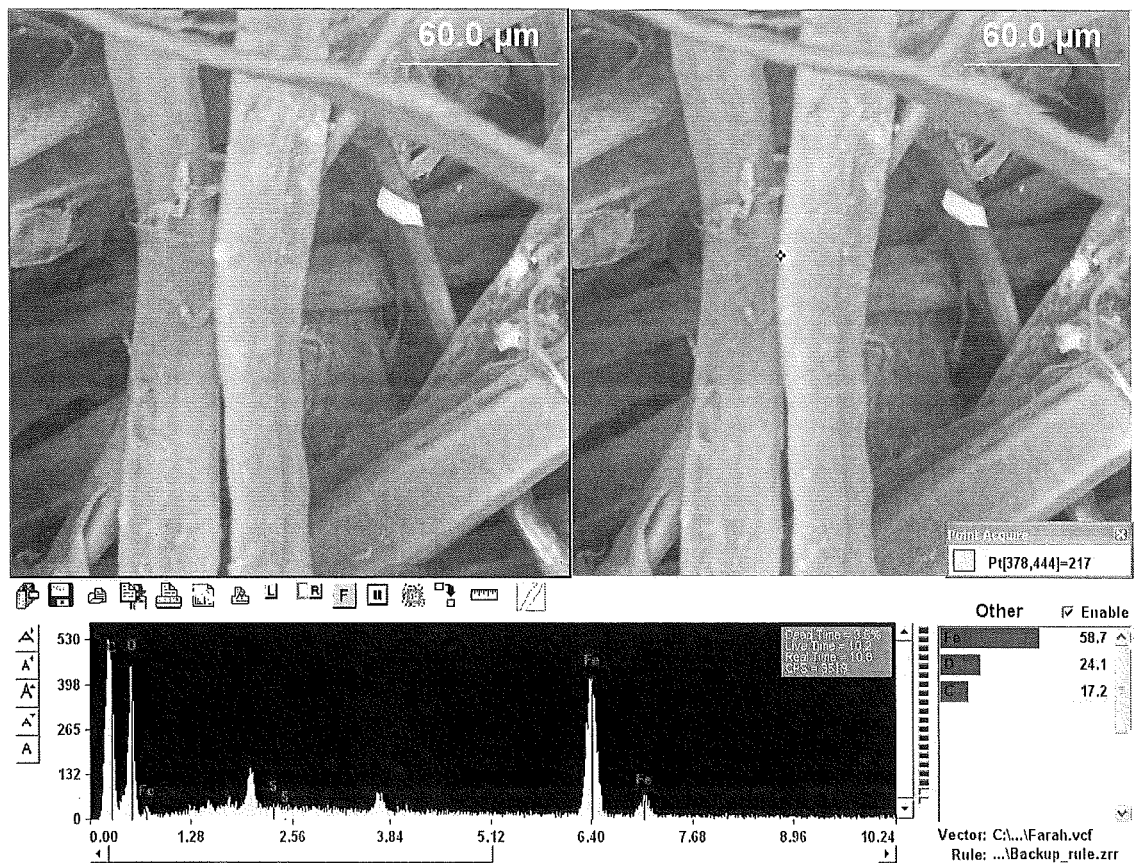
Figure 3A:
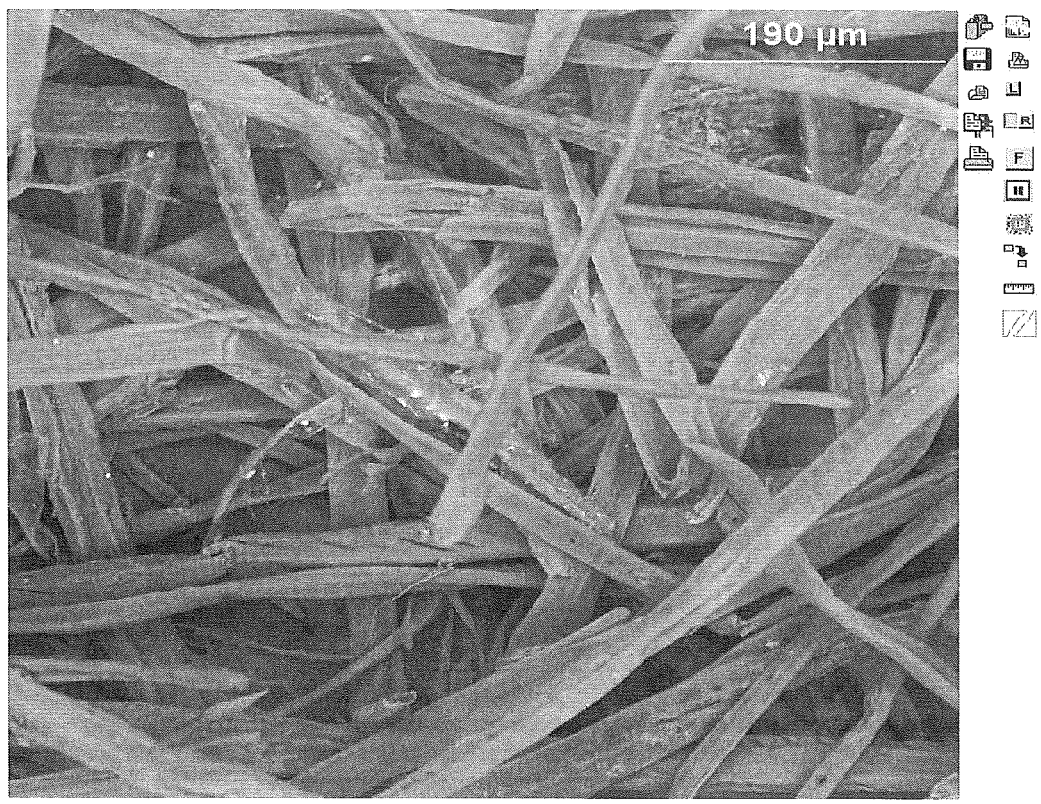
FIGS. 3(a)-(c) show SEM-EDS images of a composition as disclosed herein after culturing with phytoplankton for two weeks.
Figure 3B:
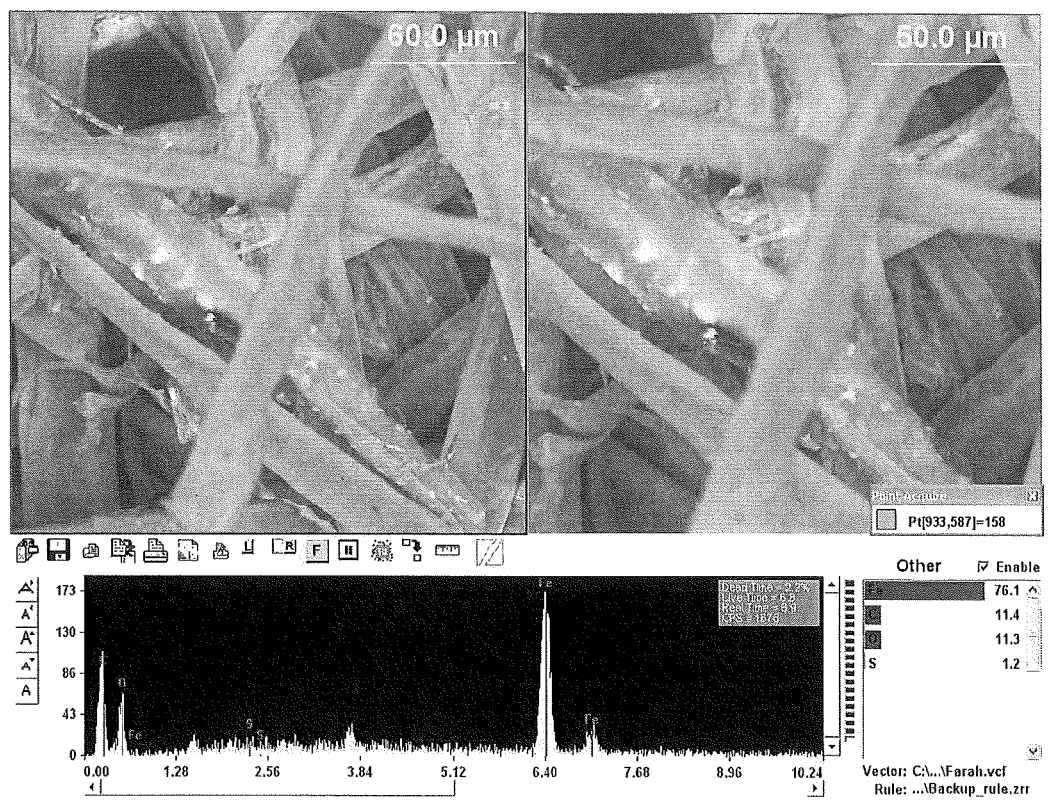
Figure 3C:
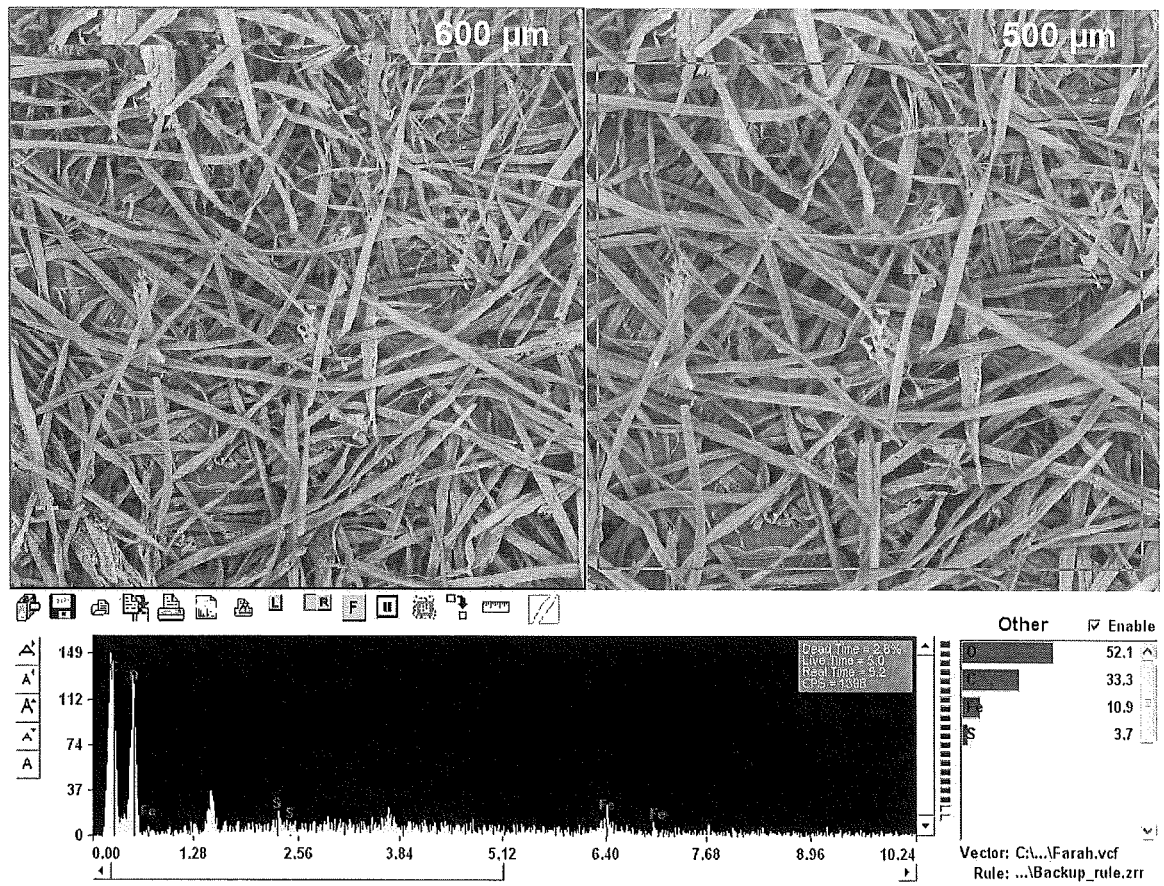
Figure 4A:
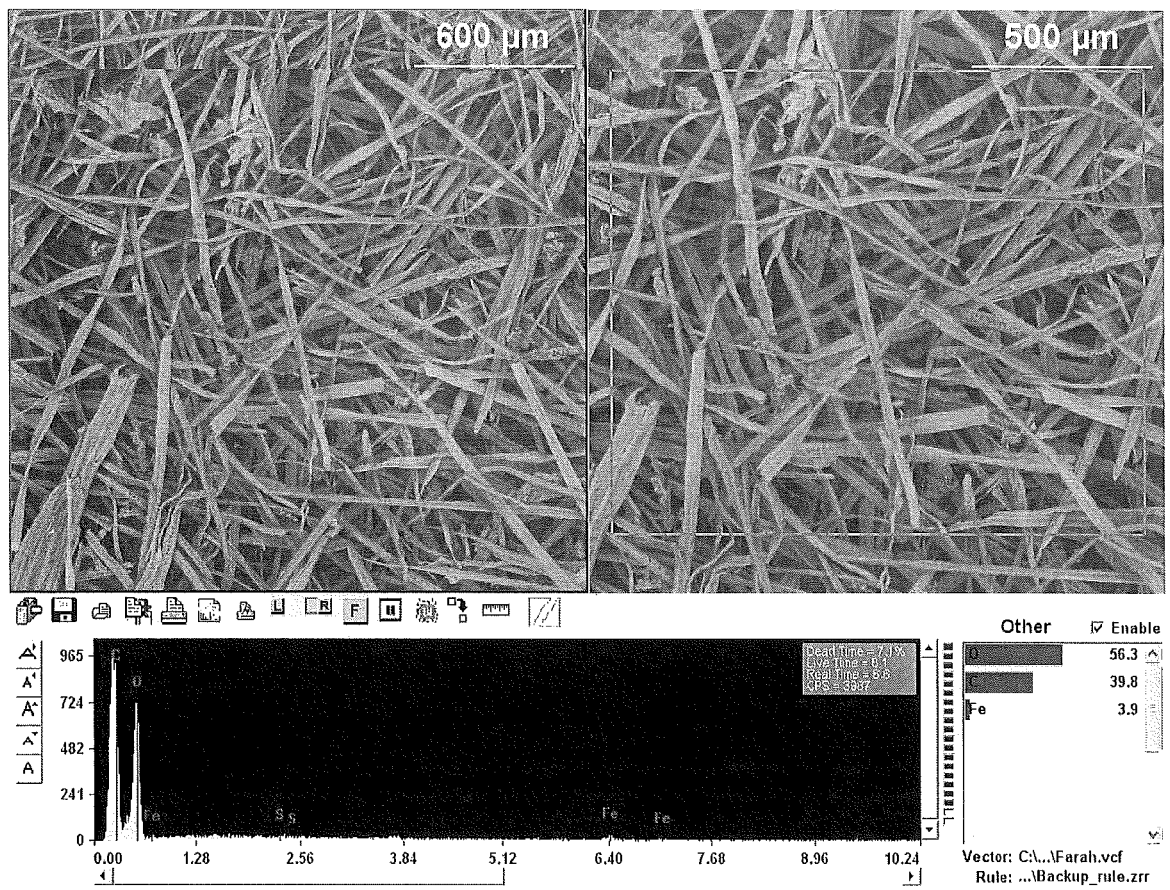
FIGS. 4(a) and (b) show SEM-EDS images of a composition as disclosed herein after culturing with phytoplankton for three weeks.
Figure 4B:
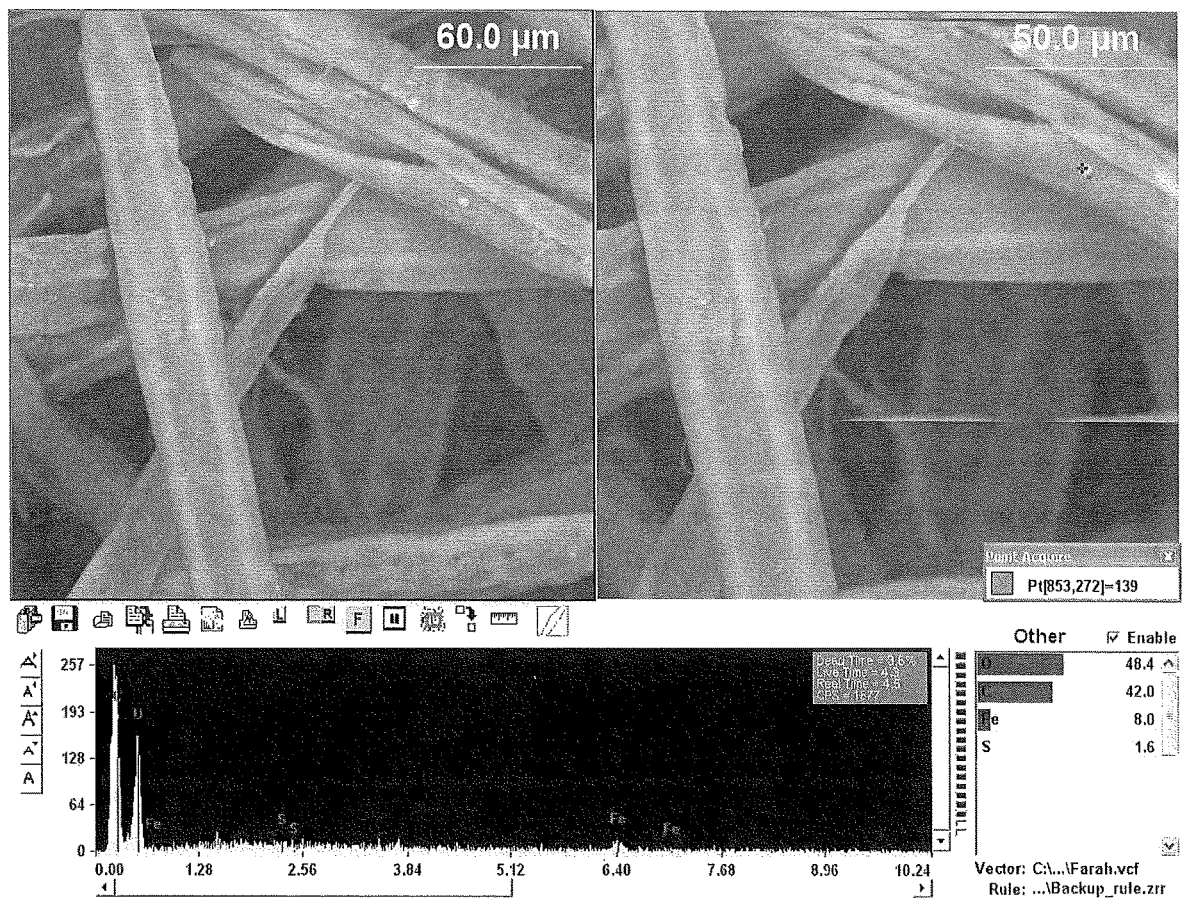

To confirm that iron was delivered to phytoplankton, SEM-EDS images of the compositions from Example 5 were obtained. FIGS. 2(a) and (b) show SEM-EDS images of the composition after phytoplankton culturing for one week. The larger particles in the spectra show iron-iron covalent bonding and the smaller particles show iron-hydroxide covalent bonding. FIGS. 3(a)-(c) show SEM-EDS images of the composition after phytoplankton culturing for an additional week (two weeks total). As can be seen from the images, the larger particles of iron have been consumed and only small particles remain. This same composition was then re-introduced to the phytoplankton for further culturing for an additional week. The results after this third culturing are shown in FIGS. 4(a) and (b) (three weeks total). These images show that almost all of the iron has been displaced from the composition in response to phytoplankton demand and the remaining particles are very pale in the images.

Example 11: Plant Growth Studies Using Zinc, Boron and Manganese Salts in Soil A series of experiments were conducted to determine the threshold of toxicity for mung bean and tomato plants in the presence of zinc, boron and manganese salts (zinc chloride, manganese chloride and boric acid, respectively). Mung bean and tomato seeds were each planted in 2 grams of sterile soil. The soil used was sourced from a retail store under the commercial brand 'sunshine mix'. This same soil was used for all the plant growth experiments. The seeds and soil were grown in autoclaved jars. They were watered with autoclaved deionized water regularly and received 16 hours of light per day at room temperature. The beans were transferred into soil after 5 days, and the tomatoes after 6 days. The plants were removed from the soil, their lengths measured from start of root to top of stem (where leaves grew). The root length was measured from the start of the root to longest root tip. They were replanted in 2 g of sunshine mix soil and watered with 5 mL of salt treatment. These treatments were a control of deionized water, 10 ppm, 25 ppm and 50 ppm of zinc, 50 ppm, 100 ppm and 200 ppm of boron and 250 ppm, 1000 ppm and 2000 ppm of manganese. The beans grew in this treatment for 10 further days, and the tomatoes for 11 days. After this time, plant length and root length were re-measured, and the change in these metrics was quantified.

Figure 5A:
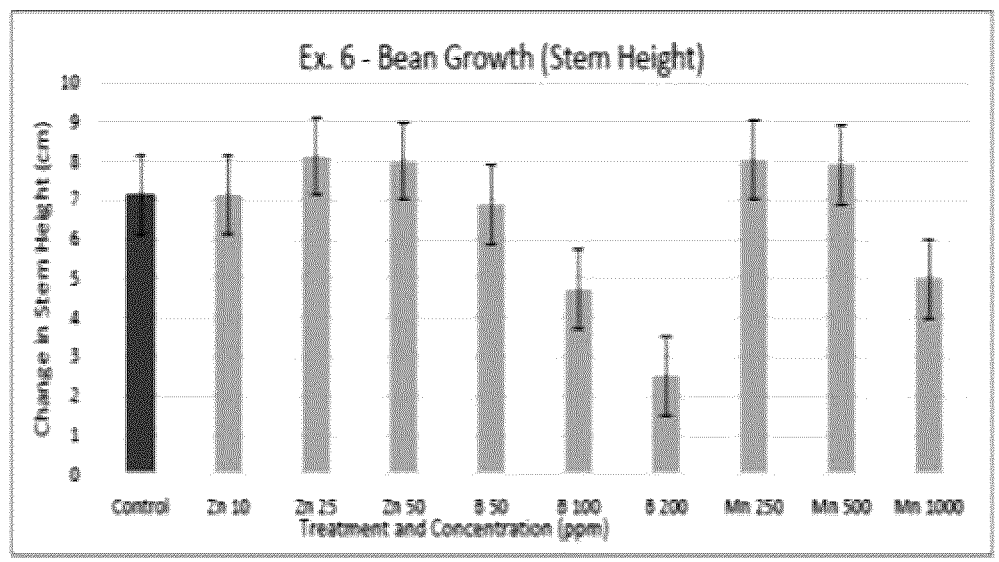
FIGS. 5(a) and (b) show growth of bean plant (a) stem height and (b) root length in the presence of various concentrations of zinc, boron and manganese salts.
Figure 5B:
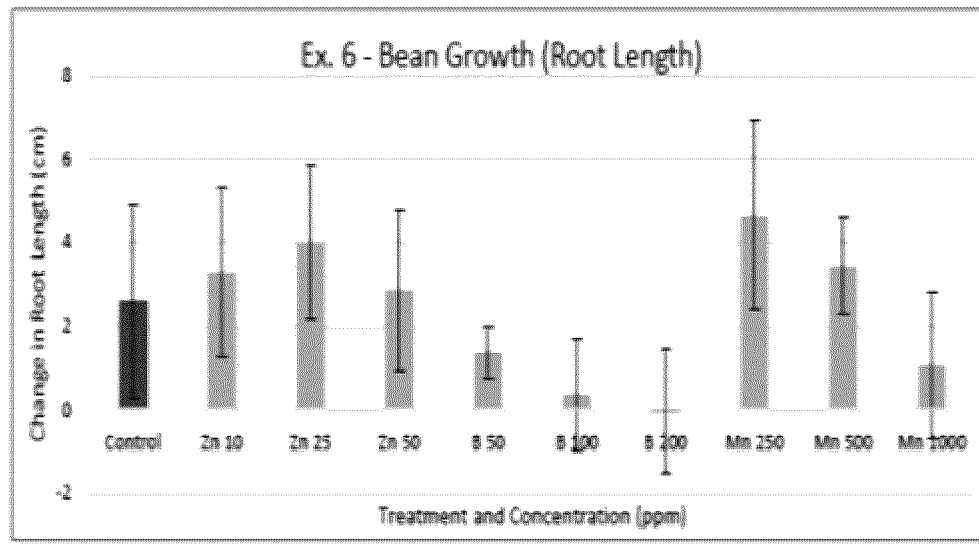

FIGS. 5(a), 5(b), 6(a) and 6(b) show growth results using soil by itself (control) and soil mixed with varying concentrations of zinc, boron and manganese salts. FIGS. 5(a) and 5(b) show that bean plant stem height and root length are noticeably reduced when boron salts in soil reach 100 and 200 ppm concentration. These Figures also show that manganese salt at 1000 ppm concentration caused reduced growth of bean plants.

Figure 6A:
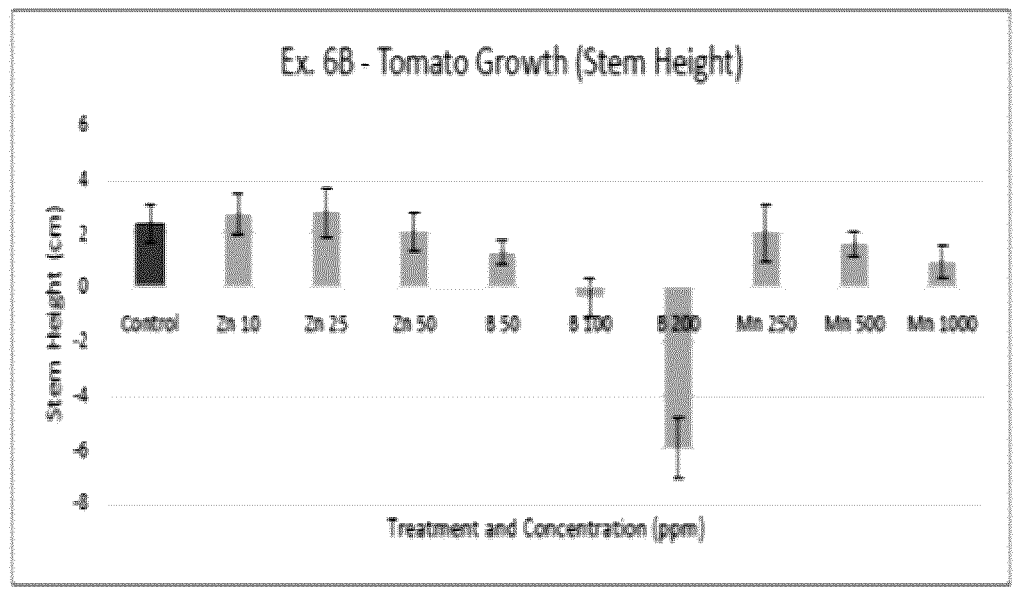
FIGS. 6(a) and (b) show growth of tomato plant (a) stem height and (b) root length in the presence of various concentrations of zinc, boron and manganese salts.
Figure 6B:
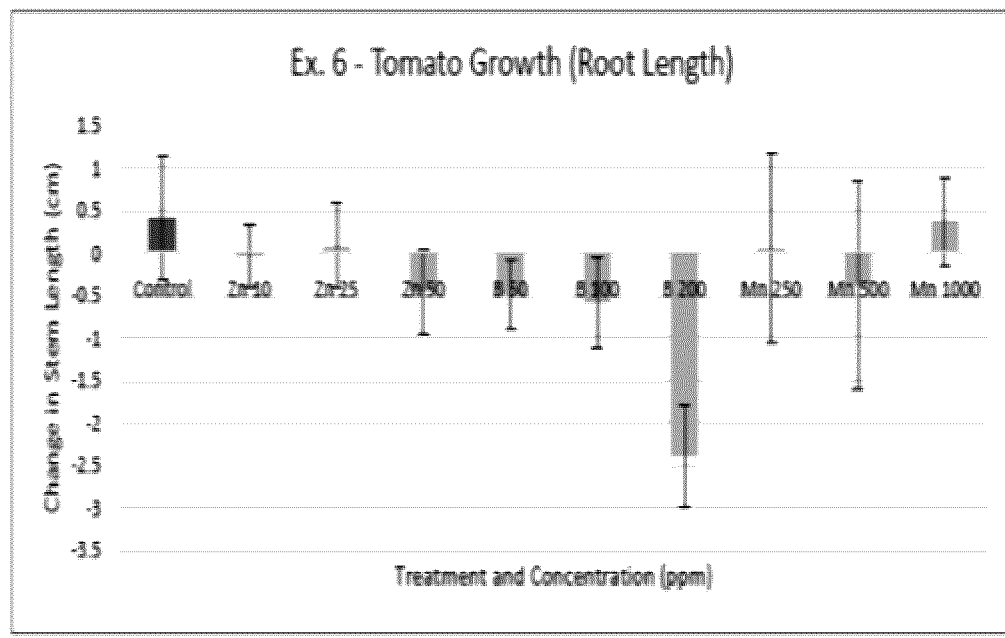

FIGS. 6(a) and 6(b) show that for tomato plants, boron at 200 ppm concentration manifested reduced growth, however, manganese at 1000 ppm concentration did not negatively impact growth.

Therefore, it was concluded that boron salts for these plants exhibited toxicity at 200 ppm for both plants and exhibited toxicity at 100 ppm for bean plants. Manganese exhibited toxicity at 1000 ppm for bean plants, but did not exhibit toxicity for tomato plants at this concentration.

Example 12: Plant Growth Studies Using Compositions Comprising Zinc or Manganese in Soil and Elevated Concentrations Mung bean seeds were planted in 2 g of sterile sunshine mix soil in autoclaved jars. They were watered with autoclaved and deionized water regularly and received 16 hours of light per day at room temperature. The beans were transferred into soil with either salt or compositions comprising zinc or manganese loaded on wood pulp after 6 days. The wood pulp, acting as the carrier, was Canfor 350/70-1 (carrier C from Table 1). The compositions were made according to the method described in Example 1 using $Zn^{2+}$ in the form of zinc chloride or $Mn^{2+}$ in the form of manganese chloride as the metal salt. The plants were removed from the soil, their lengths measured from start of root to top of stem (where leaves grew). The root length was measured from start of roots to longest root tip. The plants to be used in salt treatments were replanted in 2 g of sunshine mix soil and watered with 5 mL of their treatment. These treatments were a control of deionized water, 10 ppm, 25 ppm and 50 ppm of zinc, 50 ppm, 100 ppm and 200 ppm of boron and 250 ppm, 1000 ppm and 2000 ppm of manganese. The plants to be used in the presence of compositions as disclosed herein were sowed in 2 g of sunshine mix to which 0.1 g of the composition was added, made of various concentrations of zinc or manganese. These were all watered with 5 mL deionized water. The beans grew in this treatment for 9 further days. After this time, plant length and root length were re-measured, and the change in these metrics was quantified.

Figure 7A:
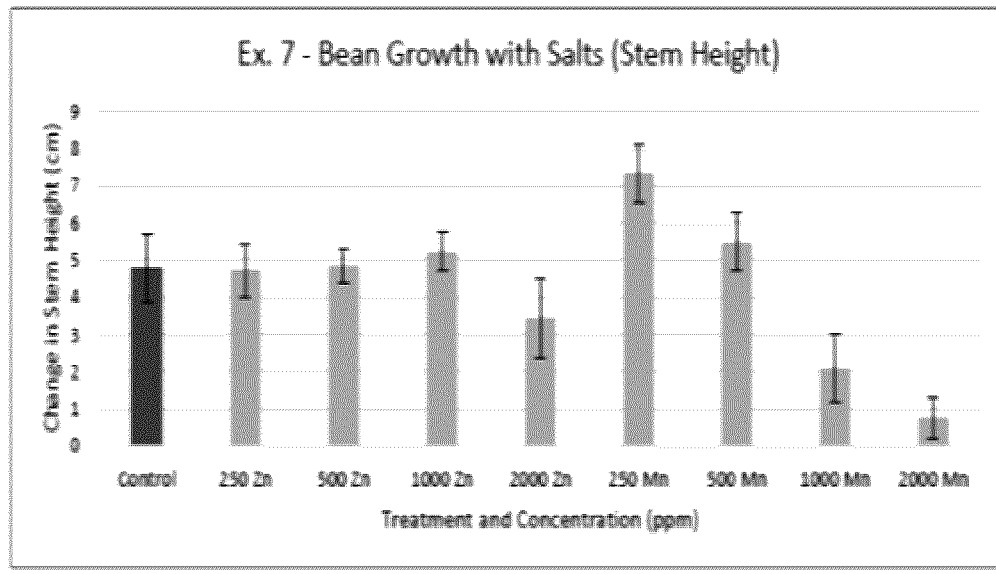
FIGS. 7(a) and (b) show growth of mung bean plant (a) stem height and (b) root length in the presence of various concentrations of zinc and manganese salts in soil.
Figure 7B:
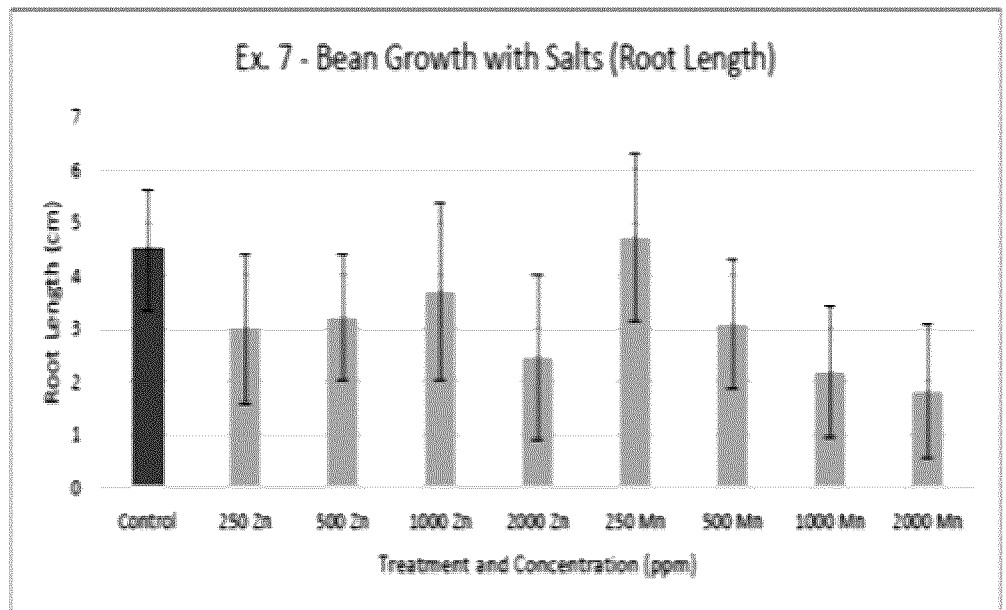

FIGS. 7(a) and 7(b) show that mung bean plants exhibited reduced stem height and root length growth at a concentration of 2000 ppm zinc and 1000 ppm and 2000 ppm manganese.

Figure 8A:
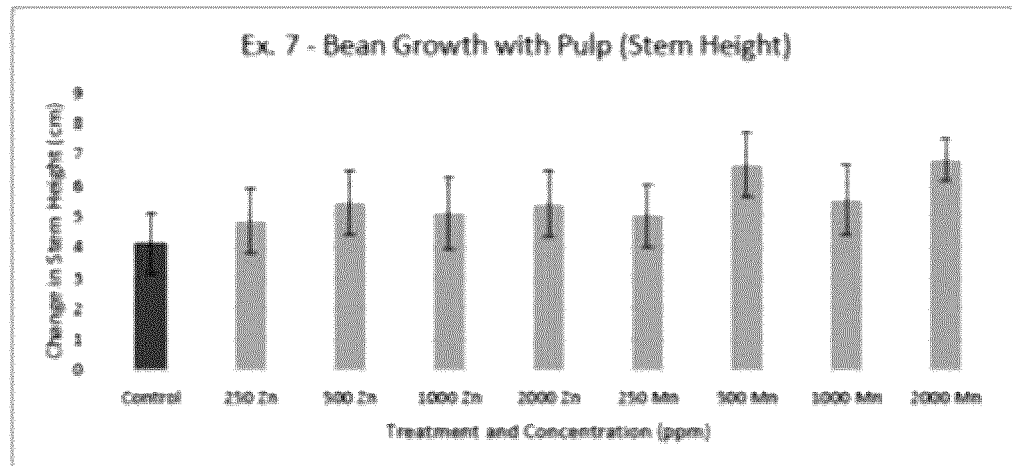
FIGS. 8(a) and (b) show growth of mung bean plant (a) stem height and (b) root length in the presence of various concentrations of zinc and manganese in the form of a composition as disclosed herein, in soil.
Figure 8B:
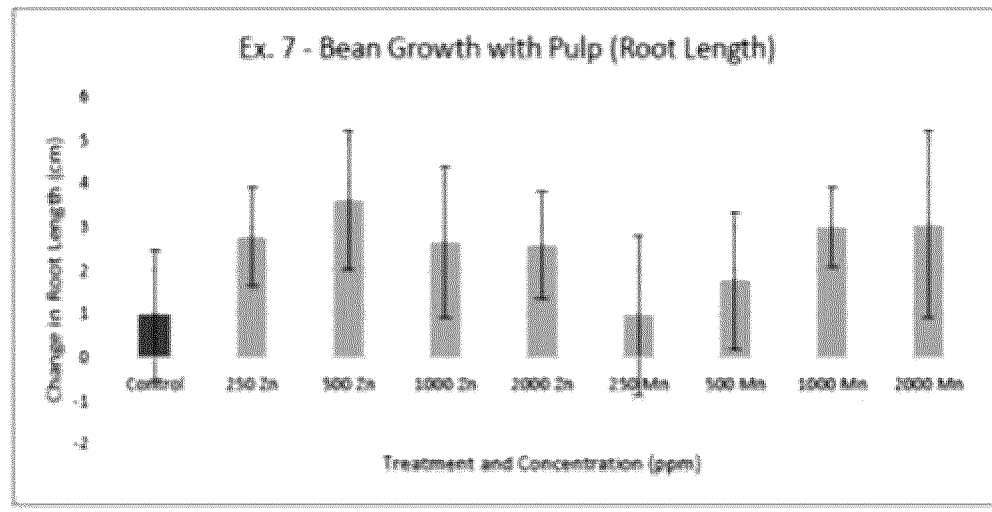

FIGS. 8(a) and 8(b) show that mung bean plants exhibited excellent growth with compositions comprising zinc or manganese loaded on wood pulp for concentrations of 250, 500, 1000 and 2000 ppm zinc and 500, 1000 and 2000 ppm manganese.

These Figures show that while 2000 ppm zinc in the form of metal salts in soil exhibits toxicity for mung bean plants, the same concentration of zinc in the form of a composition as disclosed herein does not exhibit toxicity, but rather shows improved growth over the control.

It is also shown that 1000 ppm of manganese in the form of metal salts in soil exhibits toxicity for mung bean plants, however manganese in the form of a composition as disclosed herein at double the concentration (2000 ppm) still did not exhibit toxicity, and instead demonstrated excellent growth.

Example 13: Nutrient Uptake by Plants from Compositions

In this experiment, tissues from mung bean plants were subjected to elemental analysis to determine the uptake of zinc and manganese into these plants from soil mixed with zinc and manganese loaded wood pulp.

For this purpose, mung bean plants were planted into sterilized test tubes in four different soil treatments:
A) sunshine soil mix (control);
B) sunshine soil mix with 0.05 g pure untreated wood pulp (untreated wood pulp control);
C) sunshine soil mix with 500 ppm zinc loaded on wood pulp; and
D) sunshine soil mix with 500 ppm manganese loaded on wood pulp.

The plants were watered with 5 mL sterile deionized water and allowed to grow for one week under 16 hours of light per day. The stems and leaves were then harvested, rinsed with deionized water and sent for laboratory elemental analysis.

Figure 9:
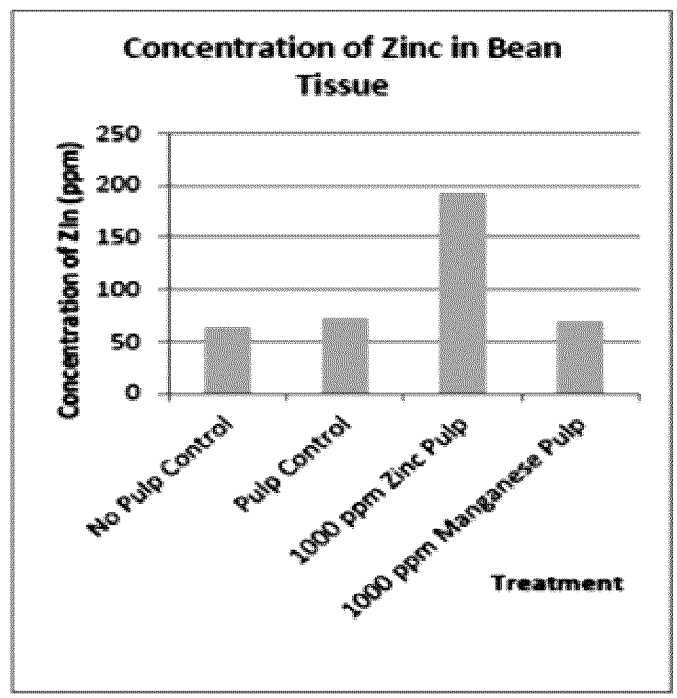
FIG. 9 shows zinc uptake by mung bean plants following various treatments.
Figure 10:
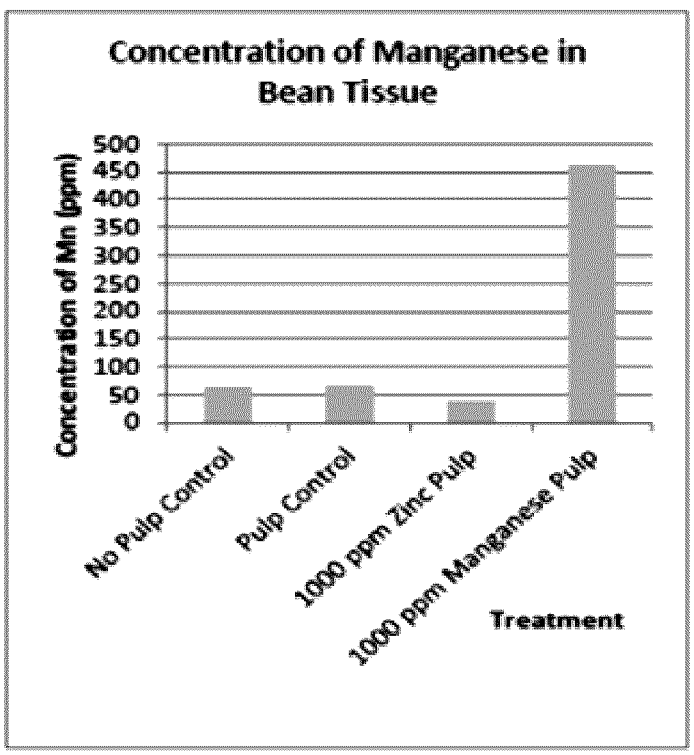
FIG. 10 shows manganese uptake by mung bean plants following various treatments.

Surprisingly, it was shown that the bean plants had an uptake of zinc that was approximately three times that of the control plants, and an uptake of approximately 8 times the manganese, as shown in FIGS. 9 and 10.

Thus, compositions as disclosed herein can be applied to soil at higher concentrations of nutrient than traditional salt fertilizers without causing toxicity. Furthermore, it appears that the plants were able to extract the nutrients at a higher rate than from salts and use them from growth. In various embodiments, compositions as disclosed herein may result in plants being able to uptake micronutrients from the compositions and retain these nutrients at very high rates compared to micronutrient uptake from salts.

Example 14: Zinc Uptake by Plants from Various Carriers

In this experiment, tissues from mung bean plants were subjected to elemental analysis to determine the uptake of zinc from zinc bonded with a variety of carriers which were wheat straw, barley straw, coconut husk and ground rice husk.

For this purpose, mung bean plants were planted into sterilized test tubes and autoclaved soil mix (sunshine soil mix). Mung bean plants were grown in soil with no additives, soil with carrier, or soil with compositions comprising the carrier and zinc. Compositions comprising the carrier and zinc were prepared in accordance with Example 1.

The soil treatments that were used:
A) sunshine soil mix 10 mL with no additives (Water)
B) sunshine soil mix 10 mL with 10 mg of coconut husk (Coconut LOW-Zn)
C) sunshine soil mix 10 mL with 50 mg of coconut husk (Coconut HIGH-Zn)
D) sunshine soil mix 10 mL with 10 mg of ground rice husk (GRH LOW-Zn)
E) sunshine soil mix 10 mL with 50 mg of ground rice husk (GRH HIGH-Zn)
F) sunshine soil mix 10 mL with 10 mg of unground rice husk (RH LOW-Zn)
G) sunshine soil mix 10 mL with 50 mg of unground rice husk (RH HIGH-Zn)
H) sunshine soil mix 10 mL with 10 mg of barley straw (Barley LOW-Zn)
I) sunshine soil mix 10 mL with 50 mg of barley straw (Barley HIGH-Zn)
J) sunshine soil mix 10 mL with 50 mg of wheat straw (Wheat HIGH-Zn)
K) sunshine soil mix 10 mL with 5 mL of 0.344 g of $ZnCl_2$ in 1 L of deionized water equimolar to 165 ppm zinc ($ZnCl_2$)
L) sunshine soil mix 10 mL with 190 mg composition equimolar to 330 ppm zinc loaded on coconut husk (ZnCoconut)
M) sunshine soil mix 10 mL with 180 mg composition equimolar to 330 ppm zinc loaded on unground rice husk (ZnRH)
N) sunshine soil mix 10 mL with 160 mg composition equimolar to 330 ppm zinc loaded on barley straw (ZnBarley)
O) sunshine soil mix 10 mL with 95 mg composition equimolar to 330 ppm zinc loaded on wheat straw (ZnWheat)

The plants were watered with 4 mL of sterile deionized water and allowed to grow for 7 days under 16 hours of light per day. The plants were then removed and directly re-sowed in pairs into autoclaved test tubes containing one of treatments A)-O). The plants were watered upon being transplanted and again on the ninth day of growth with 4 mL of water to each tube. The plants were allowed to grow under 16 hours of light per day at room temperature in a sealed vial. After day 17, they were removed from the soil and tissue samples were taken for ICP-MS analysis.

Figure 11:
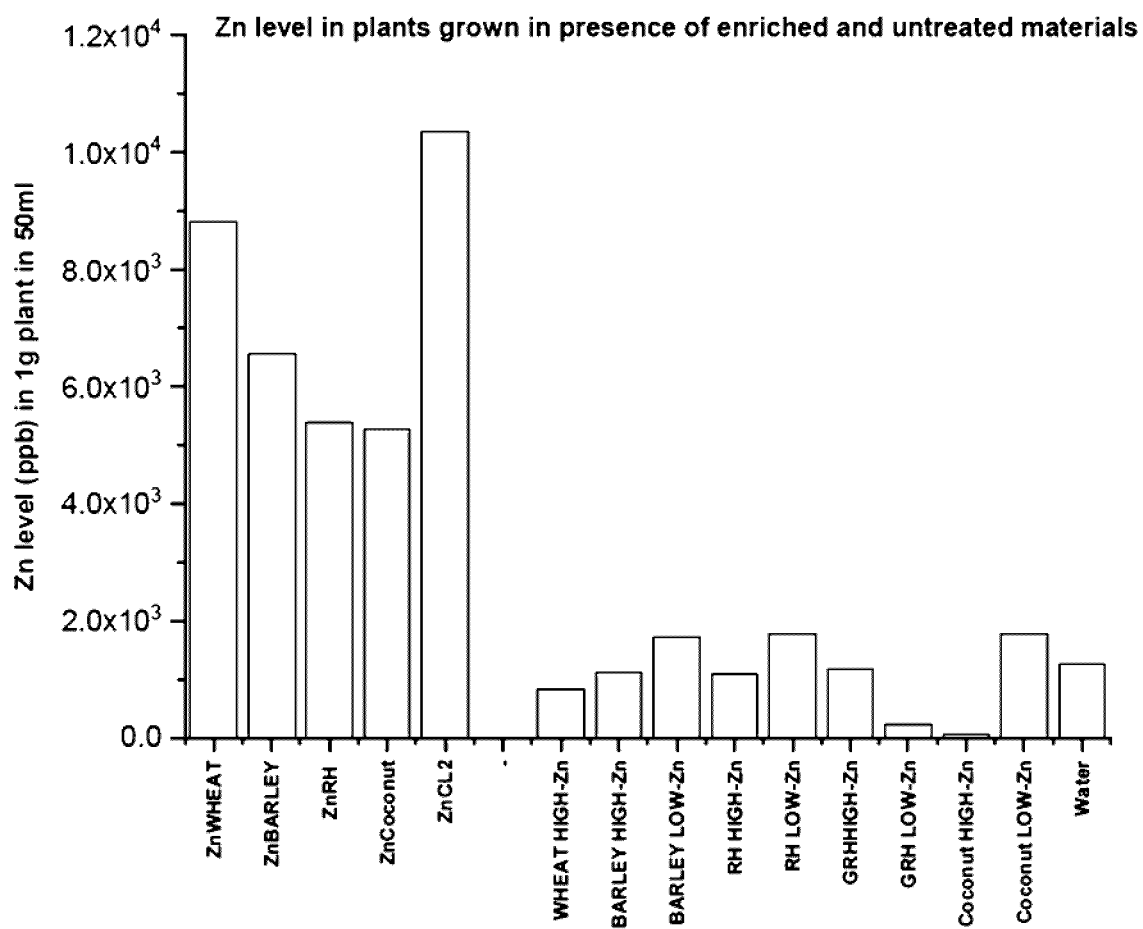
FIG. 11 shows zinc uptake by plants grown in the presence of soil, a carrier or a composition comprising a carrier and an element.

Surprisingly, the results in FIG. 11 show that zinc levels in plant tissues grown with the compositions was much higher than plants grown in the presence of the carrier alone.

Furthermore, the results show that the compositions disclosed herein are effective in providing zinc to plants in a bioavailable form using a variety of carriers.

Example 15: Manganese Uptake by Plants from Various Carriers

Example 14 was repeated using manganese instead of zinc. The soil treatments used were:

A) sunshine soil mix 10 mL with 50 mg of barley straw (Barley HIGH)
B) sunshine soil mix 10 mL with 10 mg of barley straw (Barley LOW)
C) sunshine soil mix 10 mL with 10 mg of unground rice husk (RH LOW)
D) sunshine soil mix 10 mL with 50 mg of unground rice husk (RH HIGH)
E) sunshine soil mix 10 mL with 10 mg of coconut husk (Coconut LOW)
F) sunshine soil mix 10 mL with no additives (control)
G) sunshine soil mix 10 mL with 50 mg of wheat straw (Wheat HIGH)
H) sunshine soil mix 10 mL with 50 mg of coconut husk (Coconut HIGH)
I) sunshine soil mix 10 mL with 10 mg of ground rice husk (GRH LOW)
J) sunshine soil mix 10 mL with 50 mg of ground rice husk (GRH HIGH)
K) sunshine soil mix 10 mL with 7.5 mg $MnCl_2$ equimolar to 82.5 ppm manganese ($MnCl_2$)
L) sunshine soil mix 10 mL with 830 mg composition equimolar to 165 ppm Mn loaded on coconut husk (MnCoconut)
M) sunshine soil mix 10 mL with 250 mg composition equimolar to 165 ppm Mn loaded on ground rice husk (MnGRH)
N) sunshine soil mix 10 mL with 465 mg composition equimolar to 165 ppm Mn loaded on barley straw (Mnbarley)
O) sunshine soil mix 10 mL with 433 mg composition equimolar to 165 ppm Mn loaded on wheat straw (MnWheat)

The plants were treated following the same protocol as described in Example 14.

Figure 12:
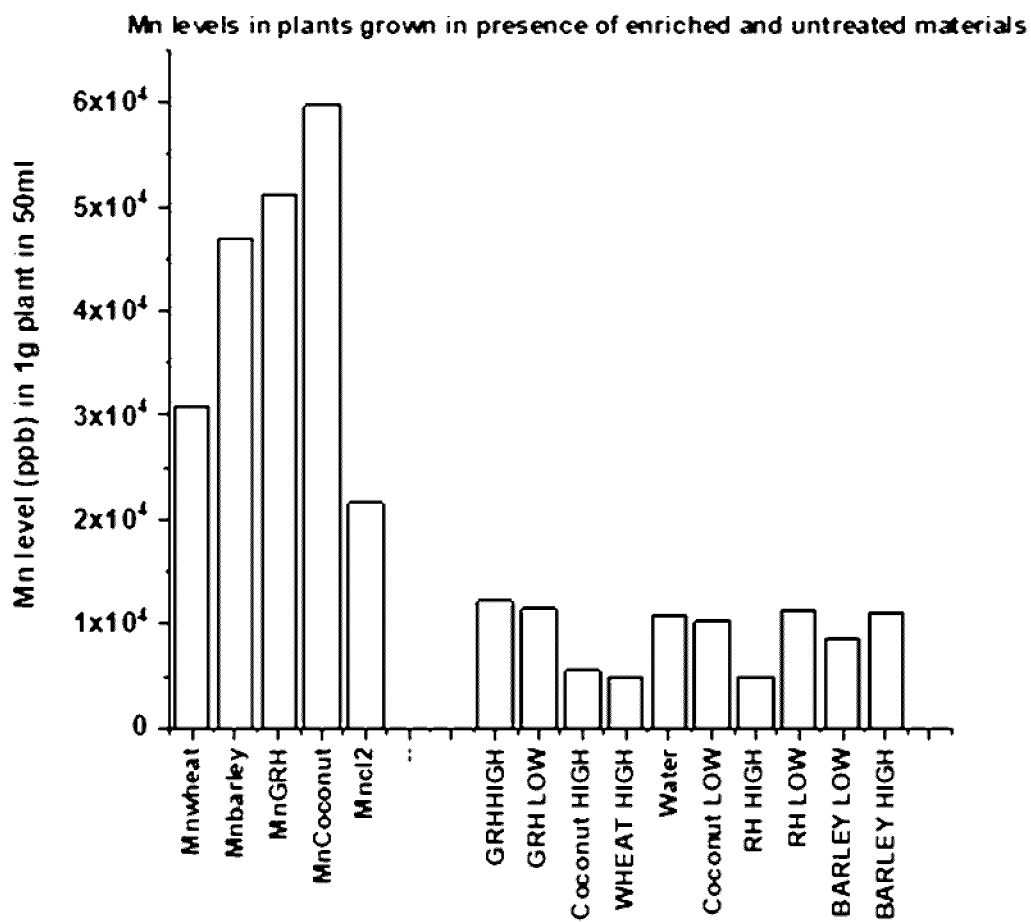
FIG. 12 shows manganese uptake by plants grown in the presence of soil, a carrier or a composition comprising a carrier and an element.

Surprisingly, the results in FIG. 12 show that the manganese level in plant tissues grown with the compositions is much higher than plants grown in the presence of the carrier alone. Furthermore, the results show that the compositions disclosed herein are effective in providing zinc to plants in a bioavailable form using a variety of carriers.

Example 16: Optimization of Variables in the Synthesis of Compositions Comprising a Rice Husk Carrier and Manganese The synthesis of the compositions disclosed herein may be optimized for various outcome, such as maximizing the amount of element bonding on the carrier by adjusting synthetic variables.

In this example, the concentrations of metal salt and base were adjusted to maximize the bonding of manganese to a rice husk carrier while holding reaction temperature and time constant. The rice husk carrier consisted of both ground and unground rice husk.

The % weight of manganese chloride and the % weight of sodium carbonate were varied as shown in Table 9. The resulting concentration of manganese bonded to the rice husk was measured using ICP-MS. In each case, 10 g of ground rice husk carrier was used, following the method of Example 1 with sodium bicarbonate as the base.

TABLE 9

Ppm of Mn in compositions comprising rice husk as the carrier by varying the amount of metal salt and base during synthesis

| Experiment # | $MnCl_2$ (% by weight) | $NaHCO_3$ (% by weight) | ppm Mn in composition |
|---|---|---|---|
| 1 | 5 | 10 | 23.3 |
| 2 | 10 | 5 | 80.9 |
| 3 | 10 | 10 | 27.9 |
| 4 | 10 | 15 | 43.7 |
| 5 | 15 | 5 | 64.3 |
| 6 | 15 | 10 | 31.5 |
| 7 | 15 | 15 | 132.7 |
| 8 | 20 | 10 | 81.8 |
| 9 | 30 | 5 | 66.8 |
| 10 | 30 | 10 | 99.9 |
| 11 | 30 | 15 | 55.6 |
| 12 | 20 | 5 | 67.7 |
| 13 | 20 | 10 | 88.5 |
| 13 | 20 | 15 | 51.9 |
| 14 | 20 | 20 | 16.9 |
| 15 | 20 | 30 | 60.2 |

Figure 13:
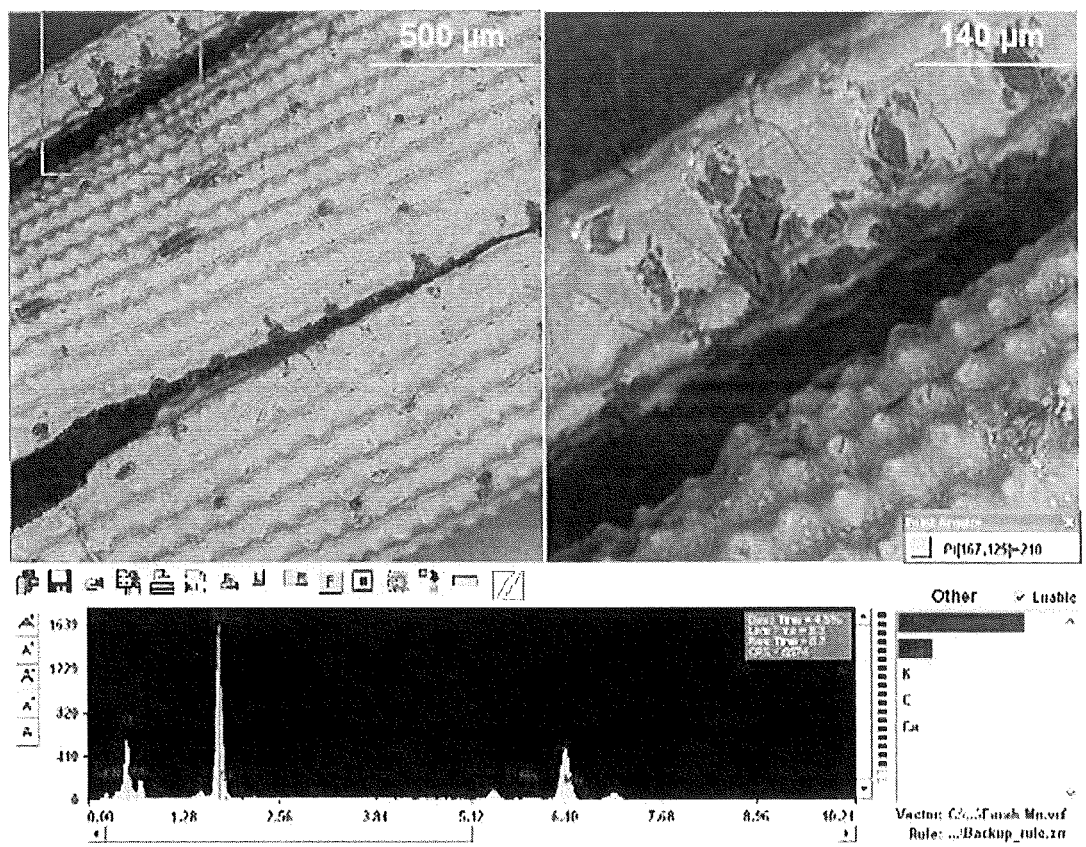
FIG. 13 shows SEM images of manganese bonded to a rice husk carrier.

According to Table 9, the highest concentration of bonded manganese to the carrier was shown in experiment #7 using 15% $MnCl_2$ by weight and 15% $NaHCO_3$. A SEM image of the resulting product is shown in FIG. 13.

In various embodiments, lower concentrations of bonded metal can be useful. For example, when applying trace metals to soil, it can be challenging to apply only very small amounts to large quantities of soil. In these cases, compositions as disclosed herein incorporating lower amounts of an element will allow larger quantities of the composition to be used in soils, making mixing and even distribution is soils easier.

Example 16: SEM Analysis of Bonding

Figure 14:
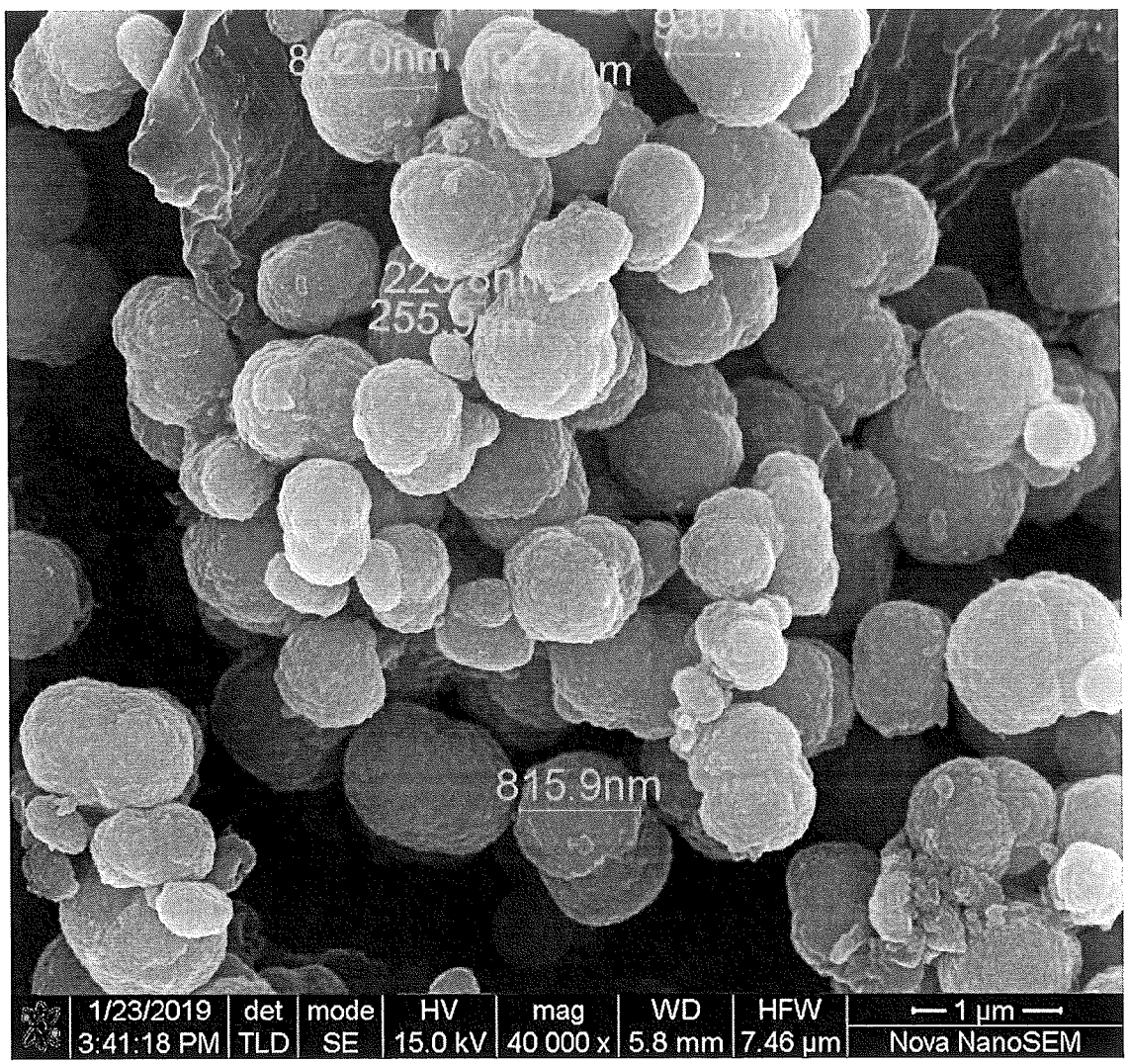
FIG. 14 shows a SEM image of manganese bonded to a rice husk carrier with submicron bonding shown, an average spherical size of 700 nm was observed.
Figure 15:
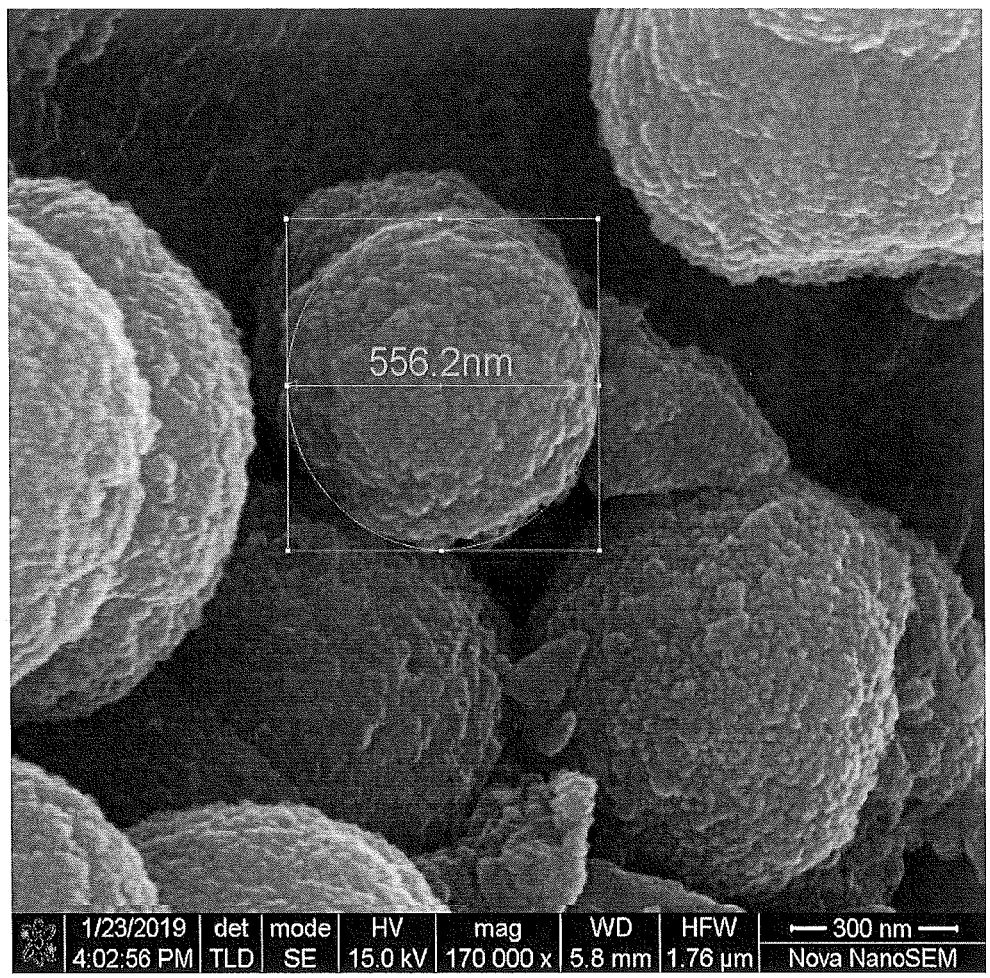
FIG. 15 shows a SEM image of manganese bonded to a rice husk carrier with an example of bonded manganese having a particle diameter of 556 nm shown.

In FIGS. 14 and 15, SEM imagery is shown of manganese bonded to the rice husk carrier. A Nano-Nova SEM was used to create the imagery. The data from FIGS. 14 and 15 show that manganese is bonded in spherical nano-sized particles with an average diameter of 700 nm.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A composition comprising:
   a carrier comprising phenolic hydroxyl moieties, aliphatic hydroxyl moieties or a combination thereof, wherein the carrier is a network of polymers and insoluble in water, and wherein the carrier comprises about 0.2% to about 40% (w/w) lignin and about 60% to about 98.8% (w/w) cellulose to total weight of the carrier; and
   an element, wherein a salt of the element is soluble in the presence of water,
   wherein an association between the carrier and the element is labile in response to biological demand and the lability of the association in the presence of water is less than the lability of the association in response to biological demand,
   wherein the association between the carrier and the element comprises element-hydroxide covalent bonding, and
   wherein the element forms an aggregate of elements, the aggregate comprising element-element covalent bonding.

2. The composition of claim 1, wherein the element is a micronutrient for phytoplankton growth and the biological demand is from phytoplankton.

3. The composition of claim 1, wherein the element is a micronutrient for plant growth and the biological demand is from a plant.

4. The composition of claim 1, wherein the element is Fe, Si, Zn, Mg, Mn, Cu, Co or B.

5. The composition of claim 1, wherein the element is $Fe^{2+}$, $Fe^{3+}$, $Mn^{2+}$, $Zn^{2+}$, $B^{3+}$ or $Cu^{2+}$.

6. The composition of claim 1, wherein the composition comprises about 0.2% to about 8% (w/w) element to total weight of the carrier.

7. The composition of claim 1, wherein the composition comprises about 2% to about 5% (w/w) element to total weight of the carrier.

8. The composition of claim 1, wherein the association is non-labile in the presence of water at a pH between about 5 and about 10.

9. The composition of claim 1, wherein the association is labile in response to biological demand and the lability of the association in the presence of water is less than the lability of the association in response to biological demand at a temperature between about 0° C. and about 50° C.

10. A method for preparing a composition as defined in claim 1, the method comprising:
    adding a base to a carrier in a solvent to deprotonate hydroxyl moieties, wherein the carrier comprises a network of polymers comprising phenolic hydroxyl moieties, aliphatic hydroxyl moieties or a combination thereof and is insoluble in water, the carrier comprising about 0.2% to about 40% (w/w) lignin and about 60% to about 98.8% (w/w) cellulose to total weight of the carrier;
    adding a salt of an element to the carrier to form the composition, the salt being soluble in water, wherein the carrier and the element form an association, the association comprising element-hydroxide covalent bonding, and wherein the element forms an aggregate of elements, the aggregate of elements comprising element-element covalent bonding; and
    isolating the composition.

11. The method of claim 10, wherein the base comprises triethylamine or sodium bicarbonate.

12. The method of claim 10, wherein between 0 and about 30% (w/w) base to total weight of the carrier is added to the carrier.

13. The method of claim 10, wherein about 5% to about 30% (w/w) base to total weight of the carrier is added.

14. The method of claim 10, further comprising heating the composition to about 80° C. following addition of the salt.

15. The method of claim 10, wherein isolating the composition comprises filtering, washing and drying the composition.

* * * * *